US010158532B1

(12) United States Patent
Meredith et al.

(10) Patent No.: US 10,158,532 B1
(45) Date of Patent: Dec. 18, 2018

(54) BANDWIDTH MANAGEMENT IN A CUSTOMER PREMISES EQUIPMENT COMPRISING MULTIPLE NETWORKS

(71) Applicant: AT&T Intellectual Property I, L.P., Atlanta, GA (US)

(72) Inventors: Sheldon Meredith, Roswell, GA (US); William Cottrill, Canton, GA (US); Radhika Gouni, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 10 days.

(21) Appl. No.: 15/610,039

(22) Filed: May 31, 2017

(51) Int. Cl.
| | | |
|---|---|---|
| H04W 4/00 | (2018.01) | |
| H04L 12/24 | (2006.01) | |
| H04L 12/26 | (2006.01) | |
| H04L 12/28 | (2006.01) | |
| H04W 8/18 | (2009.01) | |
| H04L 12/14 | (2006.01) | |
| H04W 84/12 | (2009.01) | |
| H04M 11/06 | (2006.01) | |

(52) U.S. Cl.
CPC ...... H04L 41/0896 (2013.01); H04L 12/1435 (2013.01); H04L 12/2878 (2013.01); H04L 43/0894 (2013.01); H04W 8/18 (2013.01); H04M 11/062 (2013.01); H04W 84/12 (2013.01)

(58) Field of Classification Search
CPC ...... H04W 76/12; H04W 76/10; H04L 63/08; H04L 63/0884
See application file for complete search history.

(56) References Cited

U.S. PATENT DOCUMENTS

| | | | |
|---|---|---|---|
| 8,321,900 B2 * | 11/2012 | Ramaswami | ....... H04L 12/4641 725/96 |
| 9,288,842 B2 | 3/2016 | Yeoh et al. | |
| 9,326,150 B2 | 4/2016 | MacDonald et al. | |
| 9,451,381 B2 | 9/2016 | Cholas et al. | |
| 9,516,552 B2 | 12/2016 | Anderson et al. | |
| 2008/0080457 A1 * | 4/2008 | Cole | ................... H04L 12/5692 370/342 |
| 2012/0010923 A1 | 1/2012 | Yarmolich | |
| 2012/0230189 A1 | 9/2012 | Fang et al. | |

(Continued)

FOREIGN PATENT DOCUMENTS

CN          103916855 A       7/2014

*Primary Examiner* — Khaled M Kassim
*Assistant Examiner* — Syed Ali
(74) *Attorney, Agent, or Firm* — Amin, Turocy & Watson, LLP

(57) ABSTRACT

A customer premises equipment (CPE) can allocate bandwidth to a primary user equipment (UE) connected to the CPE via a first network connection of first network (e.g., primary network) associated with the CPE. The allocation can be based upon a usage of bandwidth through the first network over a sample period. In response to a request from a secondary UE to connect to a wireless second network associated with CPE. In response to a determination that the secondary UE is authorized to access the second network, the CPE can facilitate the connection of the secondary UE to the CPE via the second network. The CPE can allocate bandwidth to the secondary user equipment based upon the first amount of bandwidth allocated to the primary user equipment, and based upon the bandwidth capacity of the link between the CPE and the fixed packet network.

20 Claims, 17 Drawing Sheets

(56) References Cited

U.S. PATENT DOCUMENTS

| | | |
|---|---|---|
| 2013/0132854 A1* | 5/2013 | Raleigh ................ G06F 3/0482 |
| | | 715/738 |
| 2013/0208693 A1 | 8/2013 | De La Forest Divonne et al. |
| 2015/0172118 A1 | 6/2015 | Lin |
| 2015/0195760 A1 | 7/2015 | Sanz et al. |
| 2015/0249623 A1* | 9/2015 | Phillips ............... H04L 65/4084 |
| | | 709/219 |
| 2016/0226790 A1 | 8/2016 | Lee |
| 2016/0249267 A1 | 8/2016 | Ho et al. |
| 2016/0373958 A1 | 12/2016 | Cao et al. |
| 2017/0325092 A1* | 11/2017 | Kneckt ................ H04W 76/14 |

* cited by examiner

BANDWIDTH MANAGEMENT IN A CUSTOMER PREMISES EQUIPMENT COMPRISING MULTIPLE NETWORKS

TECHNICAL FIELD

The present application relates generally to fixed-mobile convergence, and, more specifically, to bandwidth management for multiple networks.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). The amount of traffic in cellular networks has experienced a tremendous amount of growth and expansion, and there are no indications that such growth will decelerate. It is expected that this growth will include use of the network not only by humans, but also by an increasing number of machines that communicate with each other, for example, surveillance cameras, smart electrical grids, sensors, home appliances and other technologies in connected homes, and intelligent transportation systems (e.g., the Internet of Things (IOT)). Additional technological growth includes 4K video, augmented reality, cloud computing, industrial automation, and vehicle to vehicle (V2V).

Consequently, advancement in future networks are driven by the demand to provide and account for massive connectivity and volume, expanded throughput and capacity, and ultra-low latency.

Fifth generation (5G) mobile access networks, which can also be referred to as New Radio (NR) access networks, are currently being developed and expected to handle a very wide range of use cases and requirements, including among others enhanced mobile broadband (eMBB) and machine type communications (e.g., involving IOT devices). 5G wireless communication networks are expected to fulfill the demand of exponentially increasing data traffic and to allow people and machines to enjoy gigabit data rates with virtually zero latency. Compared to existing fourth generation (4G) technologies, such as long-term evolution (LTE) networks and advanced LTE networks, 5G provides better speeds and coverage, targeting much higher throughput with low latency and utilizing higher carrier frequencies (e.g., higher than 6 gigahertz (Ghz)) and wider bandwidths. A 5G network also increases network expandability up to hundreds of thousands of connections.

Fixed packet networks have also evolved greatly, allowing more users to connect on-line. As more homes and businesses are equipped with broadband service, and as more advancements resulting in increased data rate (bandwidth), more subscribers are able to access the Internet from home and other premises using various devices. A variety of communications modalities and devices exist, including several packet-based communications protocols (e.g., Internet Protocol (IP)) that enable broadband access to the Internet and World Wide Web. These include digital subscriber line (DSL) service(s) offered through telephone companies, and data over cable services (e.g., broadband services over the networks traditionally provided by cable television operators).

Both cellular and fixed packet networks today are used for the transfer of packets of electronic information that include data, voice, and video.

The above-described background relating to cellular networks and fixed packet networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide an understanding of the subject disclosure. It may be evident, however, that the subject disclosure may be practiced without these specific details. In other instances, well-known structures and devices are shown in block diagram form to facilitate describing the subject disclosure. For example, the methods (e.g., processes and logic flows) described in this specification can be performed by devices (e.g., a user equipment (UE), a network node device, etc.) comprising programmable processors that execute machine executable instructions to facilitate performance of the operations described herein. Examples of such devices can be devices comprising circuitry and components as described in FIG. 16 and FIG. 17.

The present patent application relates to managing bandwidth when allowing UEs (also referred to as user devices) of secondary subscriber identities of a communications service provider entity to connect to a secondary wireless local area network (WLAN) associated with a customer premises equipment (CPE), wherein the CPE is associated with a primary subscriber of the communications service provider. Bandwidth can be made available to the secondary subscriber UE, while protecting the network security of the primary subscriber identity, and while providing the targeted purchased level of bandwidth of the primary subscriber. Additionally, non-subscribers of the communications service provider entity can be excluded from accessing the WLAN.

Figure 1:
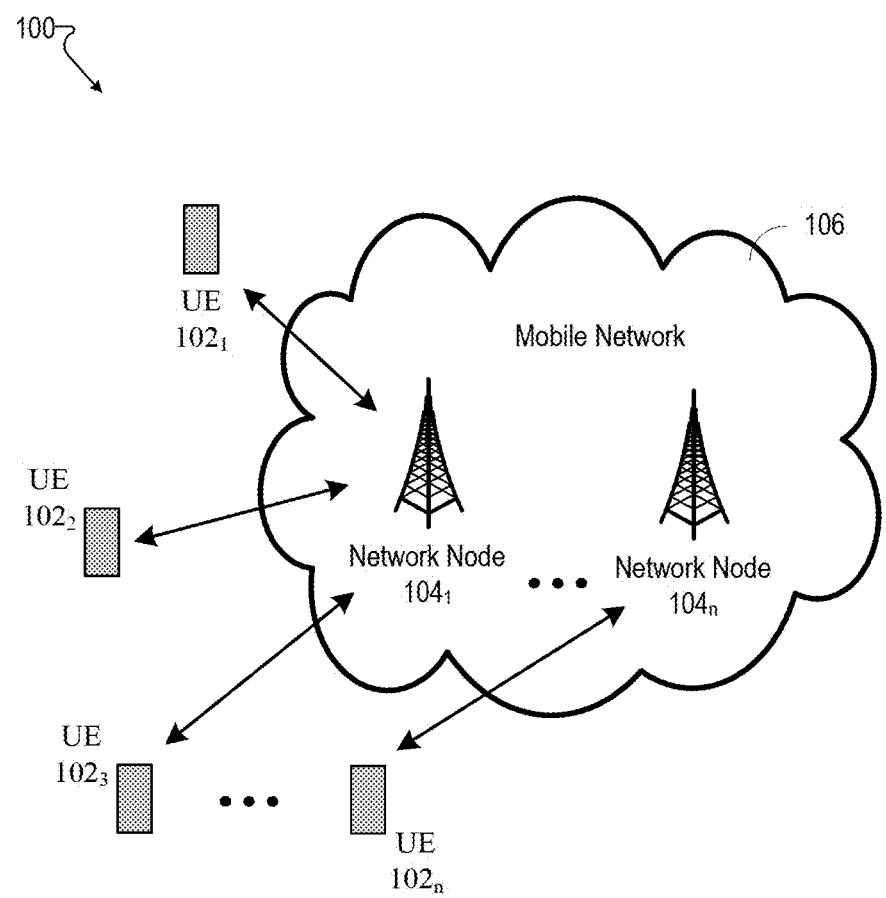
FIG. 1 illustrates an example wireless communication system in which a network node device (e.g., network node) communicates with user equipment (UEs), or user devices, in accordance with various aspects and embodiments of the subject disclosure.

FIG. 1 illustrates an example mobile communication system 100 (also referred to as mobile system 100) in accordance with various aspects and embodiments of the subject disclosure. In example embodiments (also referred to as non-limiting embodiments), mobile system 100 can comprise a mobile (also referred to as cellular) network 106, which can comprise one or more mobile networks (e.g., mobile network 106) typically operated by communication service provider entities. The mobile system 100 can also comprise one or more user equipment (UE) 102 (shown as $102_{1-n}$ in FIG. 1), also referred to as user devices. The UEs 102 can communicate with one another via one or more network node devices 104 (shown as $104_{1-n}$ in FIG. 1), also referred to as network nodes, of the mobile network 106.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. UE 102 can also comprise IOT devices that communicate wirelessly.

Mobile network 106 can include various types of disparate networks, including but not limited to, cellular networks, femtocell networks, picocell networks, microcell networks, internet protocol (IP) networks, Wi-Fi networks associated with the mobile network (e.g., a Wi-Fi "hotspot" implemented by a mobile handset), and the like. For example, in at least one implementation, mobile network 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers. For example, mobile system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, and the like.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay, a donor node controlling relay, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz, is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Figure 2:
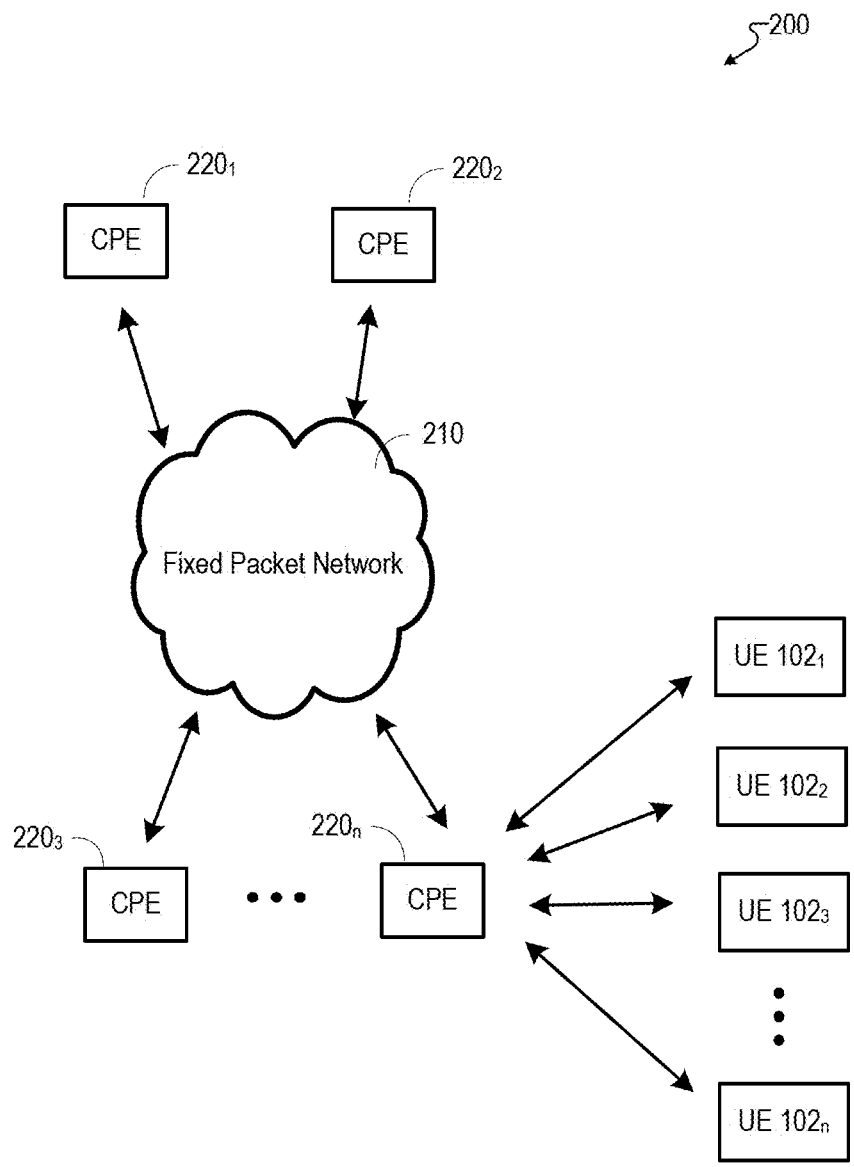
FIG. 2 illustrates an example of a fixed packet network having connected to it customer premises equipment (CPE), in accordance with various aspects and embodiments of the subject disclosure.

FIG. 2 illustrates an example of a fixed broadband system 200. The fixed broadband system 200 can comprise a fixed packet network 210, which can be accessed by user equipment (e.g., UE $102_{1-n}$) via one or more customer premises equipment (CPE) $220_{1-n}$ that provides access to the fixed packet network 210. Fixed packet network 210 can be operable to use internet protocol (IP) to deliver video, voice (e.g., voice over IP (VoIP), and data packets.

In example embodiments, the fixed packet network 210 can comprise a cable television (CATV) network implementing the data over cable service interface specification (DOCSIS) and PacketCable standards. The fixed packet network 210 can comprise headend equipment such as a cable modem termination system (CMTS) device that transmits and receives communications from one or more CPEs (e.g., CPE $220_{1-n}$ through one or more hybrid fiber coaxial cable (HFC) networks. The CPEs $220_{1-n}$, each of which has its own MAC address, can comprise cable modems (CMs) for modulating and demodulating signals to and from the cable network. CPEs $220_{1-n}$ can also comprise a telephony modem (e.g., a modem embedded with a VoIP adapter), through which a telephone $102_1$ can connect and make voice calls. Examples of such CPE that support voice and data communications are also known as embedded multimedia terminal adapters (EMTAs), digital voice modems, voice data modems, voice and internet modems, and the like. CPEs $220_{1-n}$ can also comprise gateway devices (also referred to as a residential gateway, home gateway, set top gateway) that can process video packets, voice packets, and data packets, and serve as a broadband connectivity point for various UEs $102_{1-n}$ (e.g., video set-top boxes, computers, mobile devices, telephones, etc.). The UEs (e.g., UE $102_{1-n}$) can have an appropriate wireline or wireless interface enabling communications with the fixed packet network 210 via the one or more cable modems, eMTAs, or gateway devices, for example.

Referring to FIG. 2, the fixed packet network 210 can also comprise networks using asynchronous transfer mode (ATM), digital subscriber line (DSL), or asymmetric digital subscriber line (ADSL) technology. These networks have traditionally been provided by telephone companies (telcos). ATM and DSL/ADSL equipment can be located at an exchange or central office, and can include integrated DSL/ATM switches, multiplexers such as digital subscriber line access multiplexers (DSLAMS), and broadband remote access servers (B-RAS), all of which can contribute to the aggregation of communications from user equipment onto a high-capacity uplink (ATM or Gigabit Ethernet backhaul) to internet service providers (ISPs). Transmission media connecting the central office and user equipment can include both twisted pair and fiber. The CPE 220 can comprise a DSL modem, DSL telephony modem, or DSL gateway device. The UE (e.g., UE 102) can have an appropriate wireline or wireless interface to access the DSL network via the DSL CPE.

Referring to FIG. 2, in addition to data over cable and DSL based solutions as described above, the fixed packet network 210 can also be provided via WiMAX networks implementing the IEEE 802.16 family of wireless networking standards, or any combination of those packet switched networks described herein or known in the industry. With a WiMAX network, the one or more CPEs $220_{1-n}$ can comprise WiMAX modems through which a UE (e.g., UE 102) having an appropriate wireline or wireless interface can access the WiMAX network. As with its cable and DSL counterparts, the WiMAX CPE can also comprise a telephony modem and gateway device.

Referring to FIG. 2, the fixed packet network 210 can also comprise one or more satellite networks, which can enable the exchange of voice, data, and video. In addition to television programming services, satellite networks, such as a DBS (Direct Broadcast Satellite) system, operated by DBS broadcast satellite providers (e.g., Dish Networks, DIRECTV, HughesNet), can be operable to enable high speed internet and voice services. A typical satellite broadband network can comprise a network operations center that interfaces with the Internet and transmits signals via satellite to a customer identity's premises. At the customer identity's premises, a satellite antenna (which can be mounted on a building associated with the customer identity, for example) can be operable to transmit and receive signals. With a satellite broadband network, the one or more CPEs $220_{1-n}$ can comprise satellite modems (also referred to as satmodems), through which a UE (e.g., UE 102) having an appropriate wireline or wireless interface can access the satellite network. The CPE 220 can also comprise satellite modems capable of processing voice (telephony satmodem), or a satellite gateway device.

Still referring to FIG. 2, although the described packet-based broadband IP networks have been referred to as "fixed" because of the lack of range or mobility of the on-premises access point (e.g., CPE devices), these networks can still include the use of wireless technology. For example, wireless communications can be incorporated in the delivery infrastructure of the fixed packet network (such as satellite, radio transmission towers, microwave towers, and other wireless technology), and fixed packet networks can also be accessed via a local wireless network (which typically has limited range) such as a Wi-Fi network.

Figure 3:
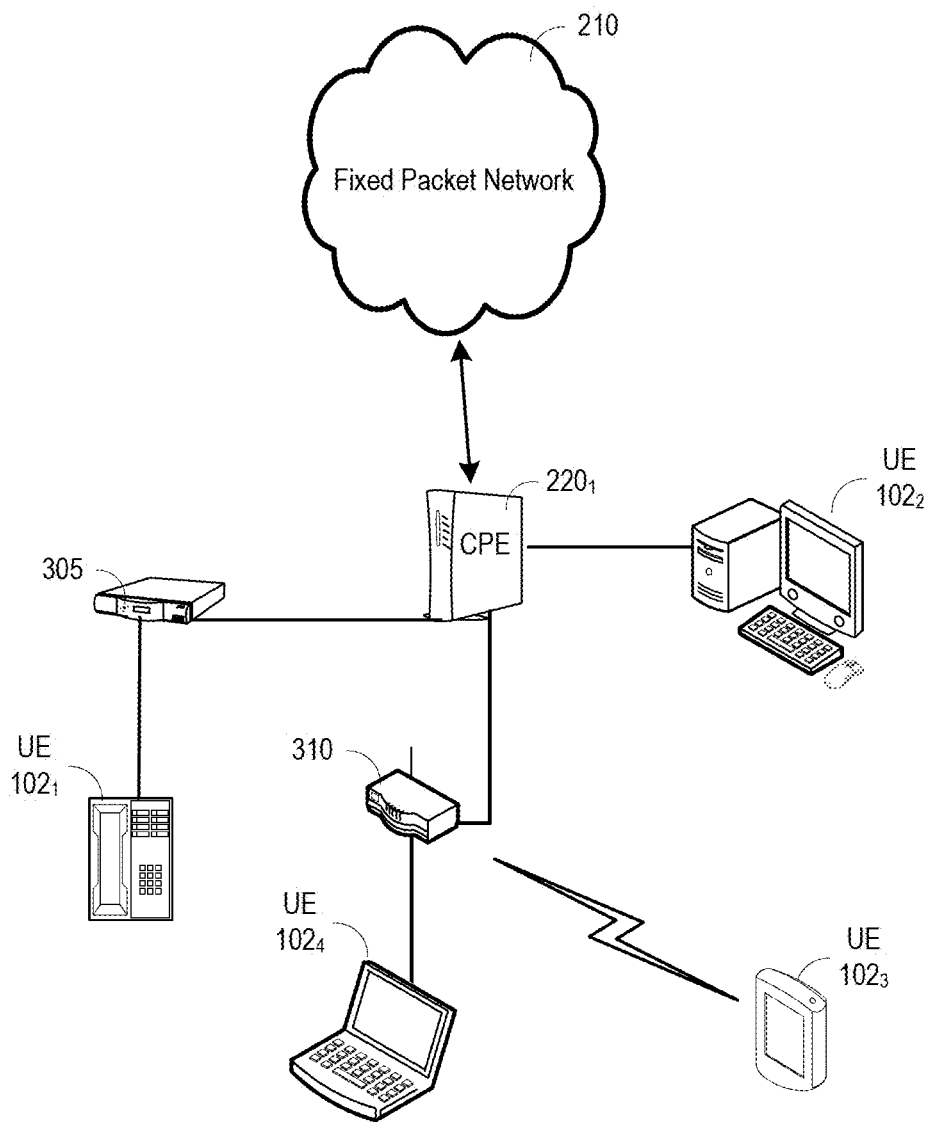
FIG. 3 illustrates another example of a fixed packet network having connected to it a CPE that is peripherally connected to a wireless access point device, in accordance with various aspects and embodiments of the subject disclosure.

FIG. 3 illustrates an example embodiment of a configuration in which a CPE (e.g., shown as CPE $220_1$) can be operable to communicate with one or more UEs (e.g., UE $102_{1-n}$). As mentioned above, a CPE can provide access for UEs to a fixed packet network (e.g., fixed packet network 210) and can comprise a broadband access modem (e.g., cable modem, DSL modem, Wi-MAX modem, satellite modem), broadband telephony modem, or gateway device.

Also, as shown in FIG. 3, a UE (e.g., shown as UE $102_2$) can be connected to the CPE $220_1$ via a wired connection (e.g., an Ethernet interface, or a universal serial bus (USB) interface). The UE can be, for example a desktop (as shown), or a laptop computer. In addition to transmitting and receiving data, for voice services, the computer can use a computer application (i.e., a "softphone" such as that offered by Skype, etc.) that enable voice calls and video calls made though the Internet. In other example embodiments, a VoIP adapter can be connected to the computer, for example, via its USB port (e.g. an adapter provided by magicJack). Additionally, the Ethernet connection can also be used to connect a VoIP adapter device (e.g., VoIP adapter device 305) to the CPE. An example of a VoIP adapter device 305 is one provided by Ooma, etc. Again, such a VoIP adapter device can typically be connected to the CPE via an Ethernet connection, and as such, the VoIP adapter device 305 can also be considered a UE. A landline telephone (e.g., shown as UE $102_1$), which in some embodiments comprise a telephone base station couple with wireless telephone handsets, can connect to that VoIP adapter (e.g., via an RJ-11 phone jack and twisted pair). The VoIP adapter enables VoIP phone calls to be made through the fixed packet network 210. In other example embodiments, such as shown and described below with respect to FIG. 4, the VoIP adapter, or its functionality, can be embedded in the CPE device, instead of connected peripherally to the CPE device.

Referring to FIG. 3, the CPE (e.g., CPE $220_1$) can, in accordance with example embodiments, be connected to a peripheral wireless local area network (WLAN) device (wireless access point 310). The wireless access point can be a wireless router that operates in accordance with the IEEE 802.11 family of standards, and can serve as an access point to the fixed packet network 210 for one or more UEs (e.g., $102_3$ as shown in FIG. 3) that have a wireless adapter (e.g., a Wi-Fi adapter) for transmitting and receiving signals between the wireless access point 310. The wireless access point 310 can establish a WLAN (referred to by some as a subnet, or subnetwork), to which one or more UEs can connect. In other example embodiments, as shown and described with respect to FIG. 4, the WLAN routing functionality can be embedded in the CPE device, instead of connected peripherally to the CPE device.

As shown in FIG. 3, the wireless access point 310 can also have a wireline interface for allowing UEs (e.g., UE $102_4$ depicts a laptop) to connect to the wireless access point 310. For example, the wireless access point 310 can have one or more Ethernet ports for UE $102_4$ to connect to the wireless access point 310 via Ethernet cables.

Figure 4:
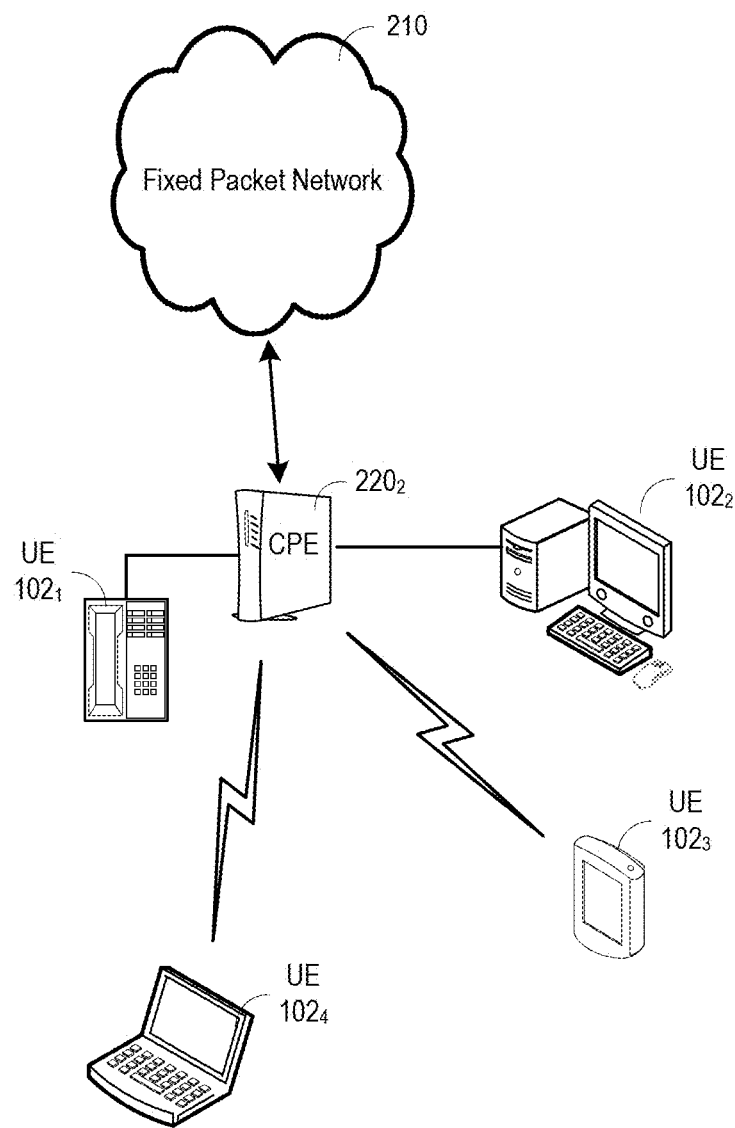
FIG. 4 illustrates another example of a fixed packet network having connected to it a CPE having wireless routing functionality, in accordance with various aspects and embodiments of the subject disclosure.

FIG. 4 illustrates example embodiments of a configuration in which a CPE (e.g., shown as CPE $220_2$) can have internal wireless routing functionality embedded within the CPE device as well as built-in VoIP functionality.

As mentioned above, a CPE can provide communications access for UEs to a fixed packet network (e.g., fixed packet network 210), and can comprise a broadband access modem (e.g., cable modem, DSL modem, Wi-MAX modem, satellite modem), broadband telephony modem, or gateway device. In example embodiments, the CPE (e.g., CPE $220_2$) can be a broadband telephony modem (e.g., a modem embedded with a VoIP adapter), through which a landline telephone (e.g., shown in FIG. 4 as UE $102_1$) can connect (e.g., via an RJ-11 phone jack and twisted pair) and make voice calls. In other embodiments, the CPE device can be a cable modem having peripherally connected to it a VoIP adapter (as shown above in FIG. 3).

Also, as shown in FIG. 4, the CPE (e.g., CPE $220_2$) can have a wireline interface (e.g., an Ethernet interface, or a universal serial bus (USB) interface) for allowing UEs to connect to the wireless access point 310 via Ethernet cables, or in some embodiments, USB cables. The UE can be, for example a desktop computer (e.g., shown ins FIG. 4 as UE $102_2$) having an Ethernet adapter (or USB port in some embodiments), or any other computing device having a Ethernet adapter, or USB port.

Still referring to FIG. 4, in example embodiments, the CPE device (e.g., CPE $220_2$) can have embedded in the CPE device Wi-Fi routing functionality that operates in accordance with, for example, the IEEE 802.11 family of standards, and can serve as an access point to the fixed packet network 210 for one or more UEs that have a wireless adapter (e.g., a Wi-Fi adapter). As shown in FIG. 4, a mobile phone (e.g., UE $102_3$ and a laptop computer (e.g., $102_4$) can communicate wirelessly via the CPE device with Wi-Fi functionality. In other example embodiments, the CPE device can have peripherally connected to it a wireless access point (as shown above in FIG. 3).

As mentioned above, 5G wireless communication networks are expected to fulfill the demand of exponentially increasing data traffic to accommodate the proliferation of mobile devices. In wireless mobile networks, radio interference can have a direct impact on coverage, link quality, and data throughput. Within a given bandwidth, capacity can be met by adding network node devices (e.g., network node $104_{1-n}$), but this can increase radio interference in the same area. Not only can there be a practical limit to the density of base stations due to handoff speeds, but the cost of adding network nodes, along with ongoing operation costs related to those network nodes, can be high. For these reasons, wireless carriers have been "offloading" mobile traffic (e.g., often referred to as "cellular data" traffic) onto fixed packet networks via Wi-Fi as a way of reducing direct wireless mobile network demand (e.g., enabling mobile devices to switch to a Wi-Fi network for transmissions when a Wi-Fi network is available). For example, a subscriber identity can use their mobile phone's cellular data connection, but then when the subscriber identity is at their home, the mobile phone switches to using the subscriber identity's home WLAN. Or, the mobile traffic has been offloaded to "open" Wi-Fi networks, e.g., Wi-Fi networks in which a password is not required in order to access the wireless network, such as one would find at Starbucks or McDonalds.

Figure 5:
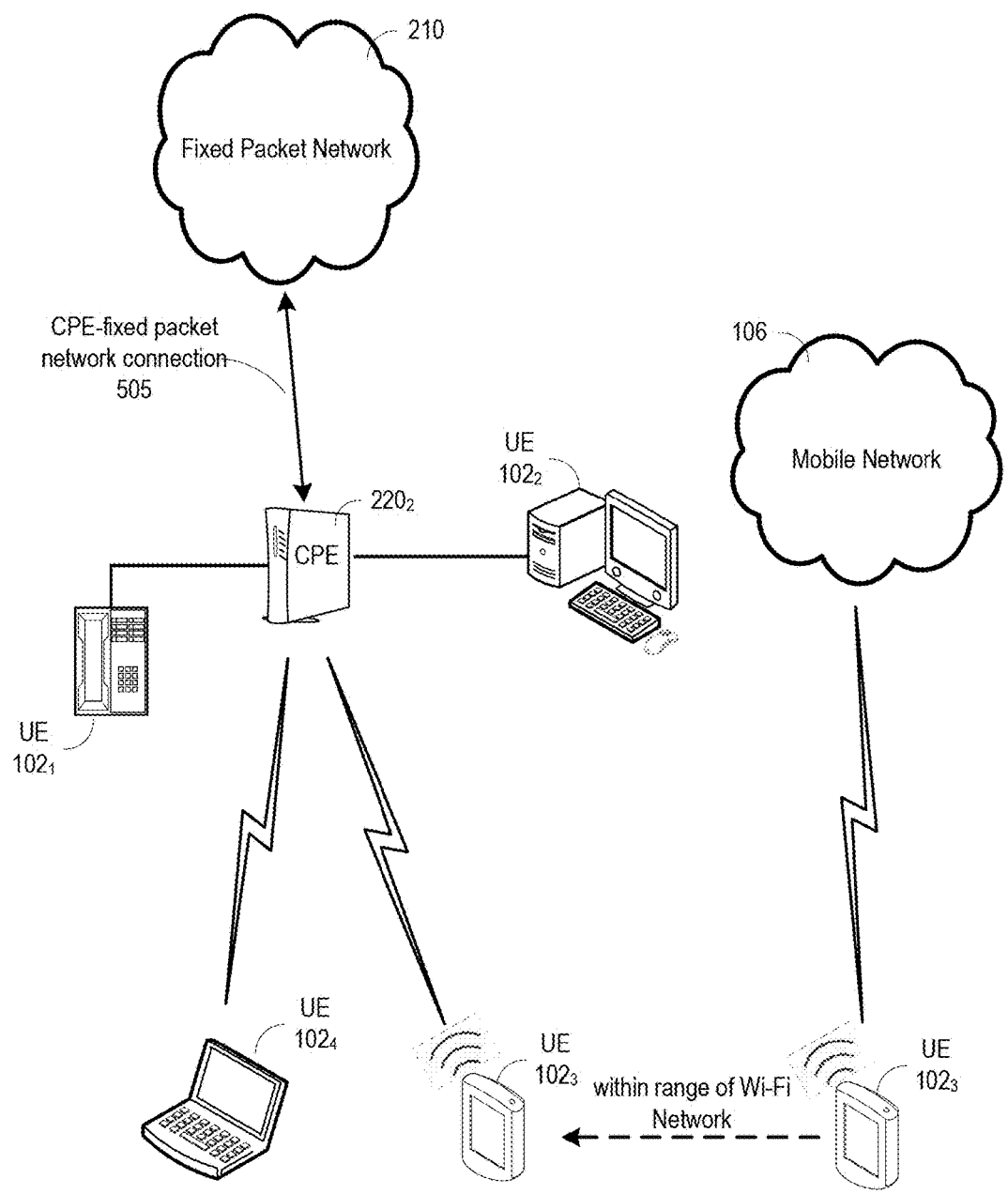
FIG. 5 illustrates an example of offloading of bandwidth usage from a mobile network onto a fixed packet network, in accordance with various aspects and embodiments of the subject disclosure.

FIG. 5 illustrates an example of this offloading. In FIG. 5, a UE (e.g., UE $102_3$) belonging to a subscriber identity (also referred to herein as the primary subscriber identity) can be receiving mobile traffic via a mobile network (e.g., mobile network 106). The subscriber identity can be watching a movie on the UE, and as such, the UE can be receiving, from the mobile network, data packets comprising video. Referring to FIG. 5, as indicated by the dotted line with arrow, when the UE enters the wireless transmission/reception range of a WLAN which can be a Wi-Fi network established by a CPE having wi-fi routing functionality (e.g., CPE $220_2$), the UE can connect to the fixed packet network through the WLAN. The WLAN might be an open Wi-Fi network that the UE had connected to previously, and thus connects to again without user input when in range of the Wi-Fi access point, or the WLAN might be a password-secured Wi-Fi network that the UE had connected to previously (e.g., a home or business Wi-Fi network). Once connected to the WLAN, the UE begins to receive data from the fixed packet network (e.g., fixed packet network 210) via the WLAN connection.

Still referring to FIG. 5, similar to the ability to offload data usage from a mobile network onto a WLAN network associated with the fixed packet network, fixed-mobile convergence (FMC) technology enabling a "handover" of a voice call from the mobile network to the fixed packet network has also been developed. As an example of such a fixed-mobile convergence (FMC) process, a user's in-progress communication session, which may be a voice call, can transition from communicating through the mobile network (e.g., mobile network 106) to communicating through a fixed packet network (e.g., fixed packet network 210) while the user is on the call with the same mobile phone, and vice versa. As an example, FMC technology can enable a subscriber identity that initiates a cellular phone call on his or her UE (which can be a dual-mode handset) outside of the range of the WLAN (e.g., a Wi-Fi network) at his or her home, to continue with the same call on the same handset, but on the fixed packet network when the subscriber identity arrives at his/her home and is within range of his home premises WLAN. Conversely, if a user having the dual-mode UE places a voice call over the fixed packet network via the fixed packet network's wireless access point, and the signal to the wireless access point signal for the fixed packet network degrades (for example if the user moves outside the premises), FMC technology can enable the user to continue with the voice call on the same mobile handset over the cellular network. Thus, the result of this FMC handover process is that a mobile handset that is sending voice packets related to a call through a mobile network subsequently sends voice packets related to the same call through a WLAN associated with a fixed packet network, and vice versa.

While the offloading and handover described in FIG. 5 can alleviate some of the some of the bandwidth demands created by the proliferation of more UEs, more mobile network usage can be dramatically offloaded onto fixed packet networks. In the offloading and FMC handover schemes described in FIG. 5, the UE switches over from a mobile network to either an open or secured WLAN accessed previously by the UE, or a secured (e.g. password-protected) WLAN. If a UE associated with a second subscriber identity were in range of a secured WLAN it had not access before, for example a WLAN established on the first subscriber identity's (or another subscriber identity's) premises, he or she would first have to obtain the password for accessing the WLAN, select the WLAN network to which the second subscriber identity wishes to connect, and then enter the password into the UE. If the second subscriber identity is unable to obtain a password, he or she would not be able to access the fixed packet network via the WLAN associated with the first subscriber identity or other subscriber identities. As such, even if there was bandwidth available through the WLAN associated with the first subscriber identity (or other subscriber identities), it would not be accessible to the second subscriber's UE without this kind of password entry and storage.

In accordance with example embodiments of the present application, a bandwidth management method is provided for UEs of secondary subscriber identities of a communications service provider to connect to a WLAN associated with a CPE, wherein the CPE is associated with a primary subscriber identity of the communications service provider. Bandwidth can be made available to the secondary subscriber UE, while protecting the network security of the primary subscriber identity, and while providing the targeted purchased bandwidth of the primary subscriber identity. Additionally, non-subscribers of the communications service provider can be excluded from accessing the WLAN.

Figure 6:
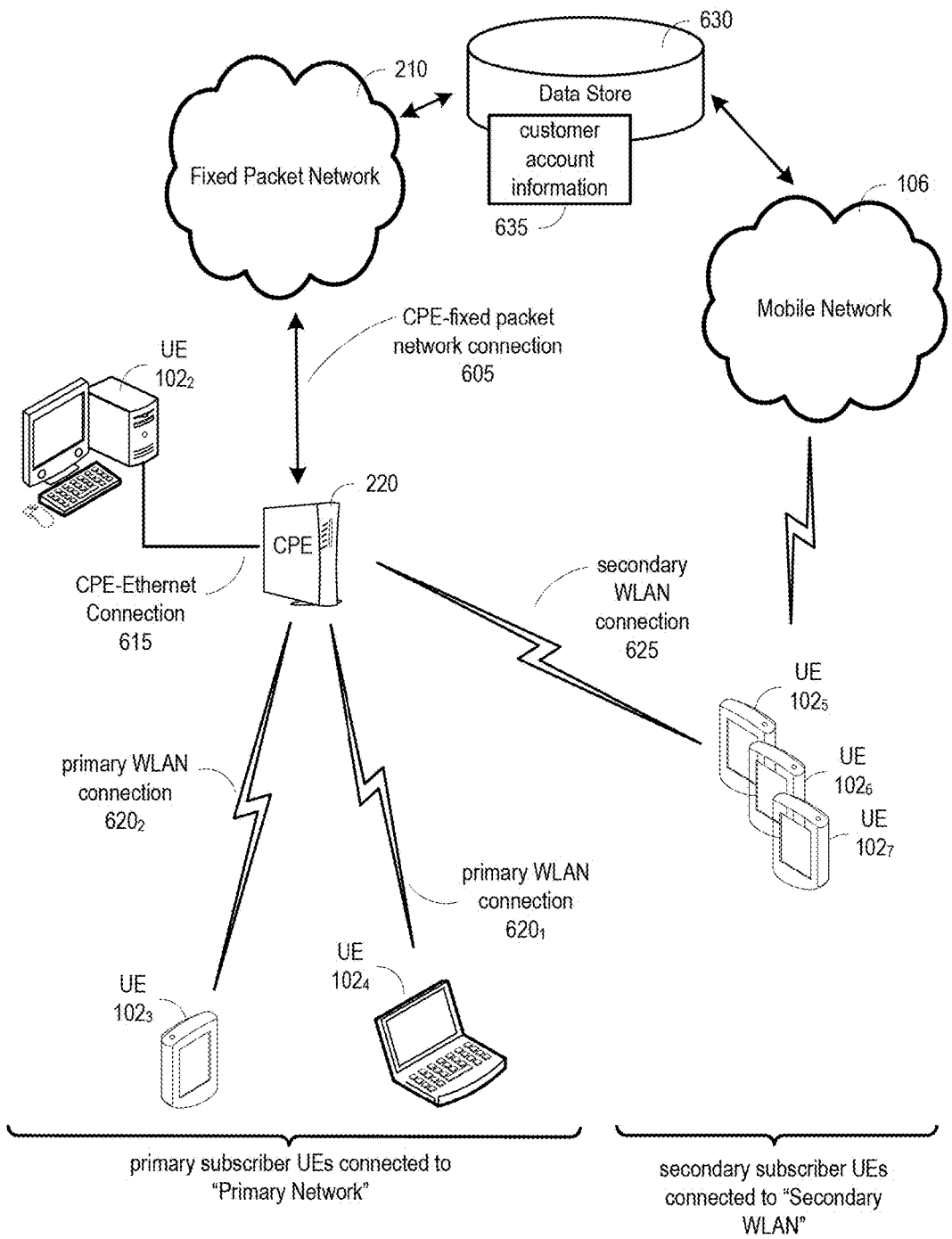
FIG. 6 illustrates an example of offloading of bandwidth usage from a mobile network onto a fixed packet network in which secondary UEs can connect to a CPE's wireless local area network, in accordance with various aspects and embodiments of the subject disclosure.

Referring now to FIG. 6, the CPE (e.g., CPE 220) can be a CPE associated with a subscriber identity (also referred to herein as primary subscriber identity) that is connected to a fixed packet network (e.g., fixed packet network 210) via a communications link (e.g., CPE-fixed packet network connection 605). As an example, the CPE can be connected to a network node of the fixed packet network, e.g., a cable modem termination system (CMTS) at a headend, or a digital subscriber line access multiplexer (DSLAM) at a central office. The fixed packet network can be operated by a communications service provider, such as a telco, cable company, satellite company, multiple service operator, and the like. The primary subscriber identity can be a subscriber (customer) of the communications service provider. In some example embodiments, the CPE can be, a CPE (e.g., CPE $220_2$ shown in FIG. 5) having embedded VoIP functionality such that a separate peripheral VoIP adapter device (e.g., VoIP adapter device 305) would not be required. In other example embodiments, the CPE can be a CPE (e.g., CPE $220_1$ as shown in FIG. 3) attached to a VoIP adapter device (e.g., VoIP adapter device 305) via a wired connection (e.g., an Ethernet connection). In some example embodiments, the CPE can be a CPE (e.g., CPE $220_2$ as shown in FIG. 5) having wireless functionality (e.g., a wireless router) embedded, such that a separate wireless access point device (e.g., wireless access point device 310) would not be required. In other example embodiments, the CPE can be a CPE (e.g., CPE $220_1$, shown in FIG. 3) that is connected to a wireless access point device (e.g., wireless access point device 310).

Still referring to FIG. 6, the CPE can, at different times, transmit and receive data via the CPE-fixed packet network connection at a particular bandwidth (e.g., rate at which data is transferred). A target minimum bandwidth available between the fixed packet network and the CPE can be based upon, for example, an agreement between the communications service provider entity and the primary subscriber identity. As an example, some communications service providers may have different tiers (or levels) of bandwidth for which their subscribers pay. A subscriber identity might subscribe to a plan in which the bandwidth might be, for example, 6 megabits per second (Mbps) downstream (e.g., from the fixed packet network to the CPE) and 1 Mbps on the upstream (e.g., from the CPE to the fixed packet network). The same communications service provider may offer another level of service that provides 9 Mbps downstream and 2 Mbps upstream. In some example embodiments, wherein the primary subscriber identity is also voice subscriber (e.g., VoIP customer), a minimum level of bandwidth can also be made available for the transmission of voice packets via the CPE. Although a landline telephone can be connected to the CPE, and the bandwidth used for VoIP calls is through the CPE, in some embodiments, VoIP calls are necessarily counted against the subscriber's minimum level of bandwidth purchased (e.g., if a user purchased 6 Mbps and for, illustrative purposes, a user made a call that was 1 Mbps, the subscriber's remaining bandwidth available out of that purchased amount would still be 6 Mbps). In other examples embodiments, wherein a subscriber identity has chosen to use their own VoIP device (e.g., Ooma) or a softphone application that relies on broadband service through a provider (as opposed to VoIP service), that amount of bandwidth for transmissions by those devices might contribute toward the subscriber's purchased amount.

Still referring to FIG. 6, typically, the bandwidth available to the CPE device is shared between the UEs communicating through the CPE device, including those UEs connected to the CPE, or any networks (or subnetworks as referred to by some) associated with the CPE. The bandwidth usage of the CPE device then, becomes the aggregate bandwidth usage of all the UEs connected to the CPE. This bandwidth usage comprises, for example, bandwidth usage by a computing device (e.g., UE $102_2$) connected through a wired local area network connection (e.g., CPE-Ethernet connection 615; in other example embodiments, this can be a USB connection). While the example in FIG. 6 of UE $102_2$ is that of a desktop computer, as mentioned above, other computing devices having an Ethernet port and Ethernet adapter can also connect to the CPE via an Ethernet interface (for example, a laptop having an Ethernet port, a VoIP adapter device, etc.). This bandwidth usage can also comprise, for example, bandwidth usage by UEs (e.g., UEs $102_3$, $102_4$) connected through the CPE's WLAN (e.g., primary WLAN connection $620_1$, primary WLAN connection $620_2$). Any primary UEs connected to the CPE through these connections can be treated as collectively being associated with a primary network of the primary subscriber identity (also referred to herein as the "primary network"), and as such, share bandwidth allocated to the CPE by the fixed packet network for the primary subscriber identity. In other example embodiments in which a communication services provider includes VoIP services, and the bandwidth for VoIP packets counts toward the primary subscriber's minimum level of bandwidth purchased, then the primary network would also comprise, for example, any VoIP network (or subnetwork) in which VoIP calls are made (e.g., UE $102_1$ and embedded VoIP components in CPE $220_2$ of FIG. 5). Thus, as an example, a subscriber identity might have subscribed to a plan having a target minimum available bandwidth of 20 Mbps. This 20 Mbps would be shared amongst, in the example shown in FIG. 6, the UEs $102_2$, $102_3$, and $102_4$ of the primary network. As such, when a UE (e.g., UE $102_5$) transitions from a state in which it is communicating through the mobile network (e.g., mobile network 106) to a state in which it is communicating through the fixed packet network, it stops using bandwidth associated with the mobile network, and begins to use bandwidth provided through the CPE and the fixed packet network.

Still referring to FIG. 6, one or more UEs (e.g., UE $102_5$, UE $102_6$, UE $102_7$) associated with one or more secondary subscriber identities (e.g., also referred to herein as secondary subscriber UEs, or secondary UEs) that are in communication with a mobile network (e.g., mobile network 106) can transition to communicating with the fixed packet network (e.g., fixed packet network 210) via one or more secondary WLAN connections (e.g., secondary WLAN connection 625), wherein the secondary WLAN connection is associated with a primary subscriber CPE (e.g., $220_2$). The mobile network and the fixed packet network can be operated by the same communications service provider, and the primary subscriber identity and the secondary subscriber identity can both be customers of that communications service provider. As described in more detail below, the amount of bandwidth available for transmissions related to the one or more secondary UEs can be based upon the primary subscriber's bandwidth usage, and whether there is any remaining bandwidth available for the one or more secondary UEs.

Still referring to FIG. 6, in the embodiment shown, the CPE can comprise built-in wireless routing functionality. The CPE can monitor the bandwidth usage on all UEs (e.g., UEs $102_2$, $102_3$, $102_4$) connected to a primary network (e.g., and any wired local area network ports (e.g., Ethernet ports allowing UEs to connect via an Ethernet connection, such as CPE-Ethernet connection 615), and primary WLAN connections $620_1$, $620_2$, etc.). One or more identifiers in the data transmitted and received can serve to identify the transmitted packets as being associated with the primary subscriber identity's network connections—that is the wired local area network connection, or the primary WLAN (and a VoIP connection if a VoIP service's packets are included as part of the purchased level of bandwidth). The primary UEs would share bandwidth allocated to the CPE for transmission through the CPE-fixed packet network connection (e.g., CPE-fixed network connection 605). The CPE can be remotely informed by the communications service provider (e.g., fixed packet network 210) regarding the bandwidth purchased by the primary subscriber identity for the primary network, per the subscriber identity's subscriber agreement. The data associated with the purchased amount can be stored in one or more network storage devices (e.g., data store 630), and in one or more customer account information databases (e.g., customer account database 635). The CPE can treat this purchased bandwidth as the target bandwidth for UEs on the primary subscriber identity network.

In the case of a primary subscriber identity WLAN connection (e.g., Primary WLAN connection $620_1$, $620_2$), the primary subscriber identity associated with the CPE can set up primary UEs (e.g., $102_2$, $102_3$, $102_4$) to access the WLAN of the CPE. The primary subscriber identity can configure primary UEs to access one or more WLANs of the CPE, wherein each WLAN network (referred to some as a Wi-Fi subnet) has a name and service set identifier (SSID) associated with it. As a typical example, a communications service provider might provide to the primary subscriber identity a CPE that is Wi-Fi ready, in that a Wi-Fi network name and password have already been set up, and all that the primary subscriber identity need do is to use the UEs to connect to the identified Wi-Fi network and enter in the provided password. In other examples, the primary subscriber identity can customize the name and password of any WLAN that is created. For instance, the primary subscriber identity might be a residential subscriber, and might name his or her Wi-Fi network "SmithFamilyWIFI" and create a password for connecting to this network. A UE within the range of the SmithFamilyWIFI network would detect the network, and the device can be operable to display the SmithFamilyWIFI network (along with any other detected networks) and indicate that it is secured. A user operating the UE would have to enter in the password in order to access SmithFamilyWIFI. While typical home subscribers only use one Wi-Fi network, example embodiments of a CPE having wireless functionality can allow for the creation of a separate wireless network. For example, the primary subscriber identity might set up another secured (e.g., requiring a password) Wi-Fi network associated with the CPE and name it "SmithFamilyWIFIGuest." UEs connected to either of these Wi-Fi networks (e.g., UE $102_3$ and UE $102_4$ can both be connected via Primary WLAN connection $620_1$ and Primary WLAN connection $620_2$ to SmithFamilyWIFI) would be associated with the primary network, and thus share bandwidth allocated according to the target amount of bandwidth purchased by the primary subscriber identity.

Still referring to FIG. 6, in example embodiments, when the one or more secondary UEs (e.g., UEs $102_5$, $102_6$, and $102_7$) are in the range of the WLAN of the CPE (e.g., CPE $220_7$), these UEs can detect all of the SSIDs from the Wi-Fi router, but would be operable to connect to a secondary WLAN (e.g., a Wi-Fi network) via a secondary WLAN connection (e.g., secondary WLAN connection 625). As shown in FIG. 6, the secondary WLAN is generated by the wireless routing enable CPE, and as such, UEs connected to the secondary WLAN's bandwidth would also be drawing from the maximum possible bandwidth available (also referred to herein as total bandwidth capacity) for transmissions through the CPE-fixed packet network connection. As mentioned above, in example embodiments, the secondary UEs belong to subscriber identities that are not the primary subscriber identity, but can be customers of the communications service provider that operates both the mobile network and the fixed packet network, and provides or rents the CPE to the primary subscriber identity. As an example, while the naming convention on the primary SSID (e.g., primary WLAN) might be SmithFamilyWIFI, the name on the secondary SSID (e.g., secondary WLAN) might be OpenATT5819. The one or more secondary UEs operable to transmit on the communications service provider's network (e.g., operable to transmit on the AT&T network) can be programmed to be operable to recognize the naming convention and try to connect to the secondary WLAN, without the secondary subscriber identity having to identity the secondary WLAN, select the secondary WLAN, and enter a password for the secondary WLAN. This preference can be programmed into the UEs with rules such as . . . "if a preferred WLAN isn't available, then try to connect to one having the prefix OpenATT," wherein the preferred WLAN can be any other WLAN that the secondary UE had previously connected to. In some example embodiments, the secondary WLAN can be open (unsecured), but the CPE can use the secondary UE's credentials to ping an authentication server that has access to, for example, a home location registry (HLR, which can be stored in, for example, data store 630) to determine whether the secondary UE belongs to a subscriber identity of the communications service provider, and then accept or reject the connection. In some example embodiments, the secondary WLAN can be secured, and the secondary UEs can be programmed with the password for the secondary WLAN. In some example embodiments, the secondary WLAN would not appear in the list of displayed Wi-Fi networks, but can still be connected to without user input once the secondary WLAN is in range of the secondary UE. Additionally, UEs not belonging to a subscriber of the communications service provider would not be granted a connection by the Wi-Fi router. In example embodiments, to prevent non-communications subscriber devices from gaining access to the secondary WLAN network, example embodiments can use a public/private key interchange with the UE, multi-second delays between registration/authentication attempts, media access control (MAC) address filtering, and other methods such as detecting the same device credentials being used simultaneously at distant locations (which can indicate fraud).

Still referring to FIG. 6, in some example embodiments, the one or more secondary UEs connected to the secondary WLAN can, in some circumstances, be operable to access any bandwidth not allocated to the primary sub-net (wireless and wired connections). The maximum possible bandwidth (e.g., total bandwidth capacity) available for transmissions between the CPE-fixed packet network connection (e.g., CPE-fixed network connection 605), which can sometimes be greater than the target bandwidth level purchased by the subscriber identity, minus what is allocated to the CPEs on the primary subscriber's network is the amount of bandwidth that can be available to secondary UEs that are granted access to the secondary WLAN. Of note, as mentioned above, there is a maximum possible bandwidth for both upstream transmissions, as well as downstream receptions.

The maximum possible bandwidth can be determined by the CPE using ping/ack transfers to a remote server to dynamically assess maximum possible bandwidth (e.g., similar to Internet speed tests that a UE would run to determine the bandwidth capacity for a broadband connection). These ping tests can be repetitive and the resulting measured bandwidth, plus any contemporaneous bandwidth usage, would sum to the total measured bandwidth.

UEs on the primary subscriber network can be dynamically allocated bandwidth based on historical behavior (or patterns), and based on the amount of bandwidth purchased by the primary subscriber identity. The allocation of bandwidth to UEs on the primary network can be, for example, subject to an algorithm that continually monitors the actual usage of all UEs connected to the primary subscriber's network. Bandwidth allocation can be based upon a weighted average demanded bandwidth with bias towards the most recent bandwidth usage measured. This allows bandwidth allocation decisions to be made over a period of time based on historical bandwidth usage, without over-responding to short term peak demands. The algorithm also provides a method to test whether more bandwidth should be allocated. When the collective UEs on the primary subscriber network are using data bandwidth close to the current allocation, the algorithm can temporarily increase the offered bandwidth to determine if those collective UEs consume the offer. Additionally, the bandwidth allocation to UEs on the primary network can comprise a bandwidth overhead margin to account for short-term demand deviations.

Still referring to FIG. 6, during a period (or situation, condition, scenario, etc.) when the communications service provider is not attempting to offload mobile traffic from the mobile network to the fixed packet network, current Wi-Fi routers can make all bandwidth available for the UEs on the primary subscriber's network, even if that amount of bandwidth exceeded the bandwidth purchased by the primary subscriber identity. However, in example embodiments, when the communications service provider desires to offload mobile traffic from the mobile network, and when one or more secondary subscriber UEs might be in range of the CPE and connected to the secondary WLAN of the CPE, all of the bandwidth available might not be allocated for the primary network. In example embodiments, the bandwidth amount allocated for the primary subscriber's network would not exceed a level of bandwidth specific to the primary subscriber identity, which can be a level of bandwidth purchased by the primary subscriber identity. Thus, if there is any available bandwidth (e.g., up to the maximum possible bandwidth) that is beyond the purchased amount, that amount of bandwidth can be available for any of the secondary UEs.

Still referring to FIG. 6, regarding the allocation of bandwidth, in example embodiments, when the collective bandwidth usage (e.g., usage by primary subscriber UEs, such as $102_2$, $102_3$, $102_4$) on the primary network is near the allocated bandwidth, the CPE can temporarily increase the allocation to test if it is consumed. The re-allocation of bandwidth to UEs on the primary network can be made to be very fast, since the primary subscriber identity is paying for the resources and should not have to wait excessively for resources to be released from secondary WLAN use by secondary UEs. Therefore, when the bandwidth used on the primary network approaches the allocation, an allocation increase can be immediate (up to the purchased bandwidth during off-load hours). In example embodiments, one method of accomplishing the bandwidth allocation can be the implementation of a Layer 3 packet switch which that is dynamically monitoring real-time bandwidth usage on the primary subscriber network devices. The CPE may also insert packet delays to "slow down" the bandwidth utilization on the secondary SSID (e.g., secondary WLAN). Because packet sizes can be affected by MIME-types, a rule set can be used for biasing the packet switching using estimated or projected packet sizes.

FIGS. 7-11 show some examples to illustrate the features and functionalities as described in reference to FIG. 6 above. In each graph, the bandwidth levels shown are, by way of example, for downstream transmissions. As mentioned above, upstream transmissions can have their own separate maximum total bandwidth, and purchased level of bandwidth.

Figure 7:
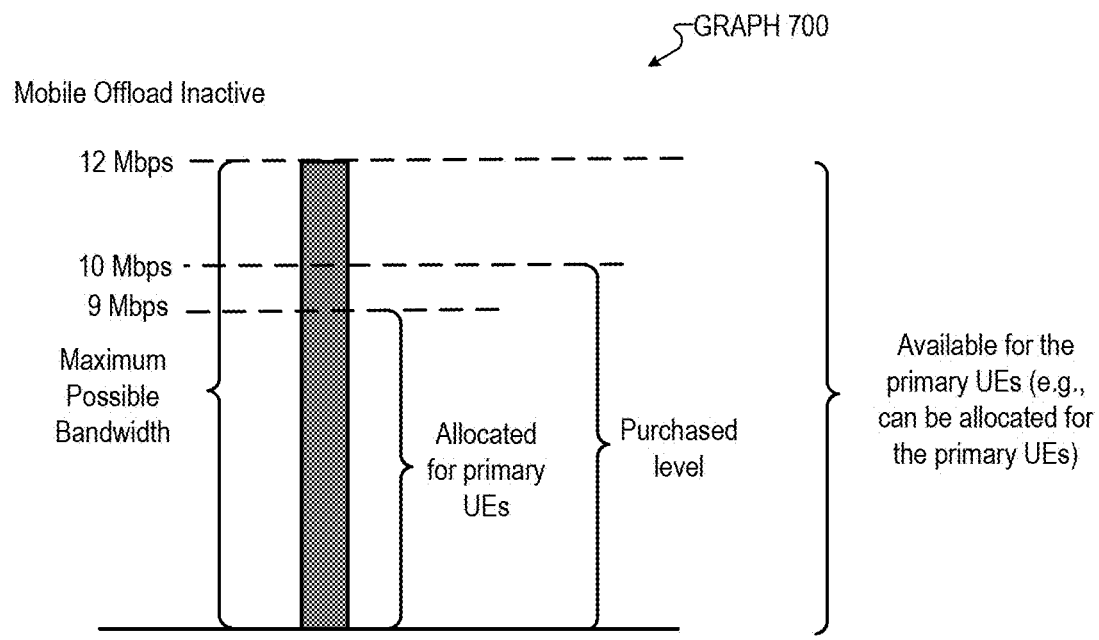
FIGS. 7-11 illustrate graphs showing examples of bandwidth allocation and management, in accordance with various aspects and embodiments of the subject disclosure.

FIG. 7 presents an example in which mobile offload is inactive (e.g., mobile offload incactive)—that is, the service provider is not attempting to offload mobile traffic from the mobile network to the fixed packet network (e.g., due to a period in which the mobile network experiences nominal or no congestion). In this situation, the CPE can make all bandwidth available for the UEs on the primary network, even if that amount of bandwidth exceeded the bandwidth purchased by the primary subscriber identity. Here, the maximum possible bandwidth is 12 Mbps, and the current allocation to the primary UEs is 9 Mbps (as mentioned above, the allocation can be based upon measured usage, and can also in some example embodiments, include an overhead margin for sudden increase in demand) Even though the subscriber identity paid for a bandwidth level of 10 Mbps (as shown), if the primary UEs demand for bandwidth were to exceed 10 Mbps, then in this condition (mobile offload inactive), the entire 12 Mbps can be allocated to the primary UEs.

Figure 8:
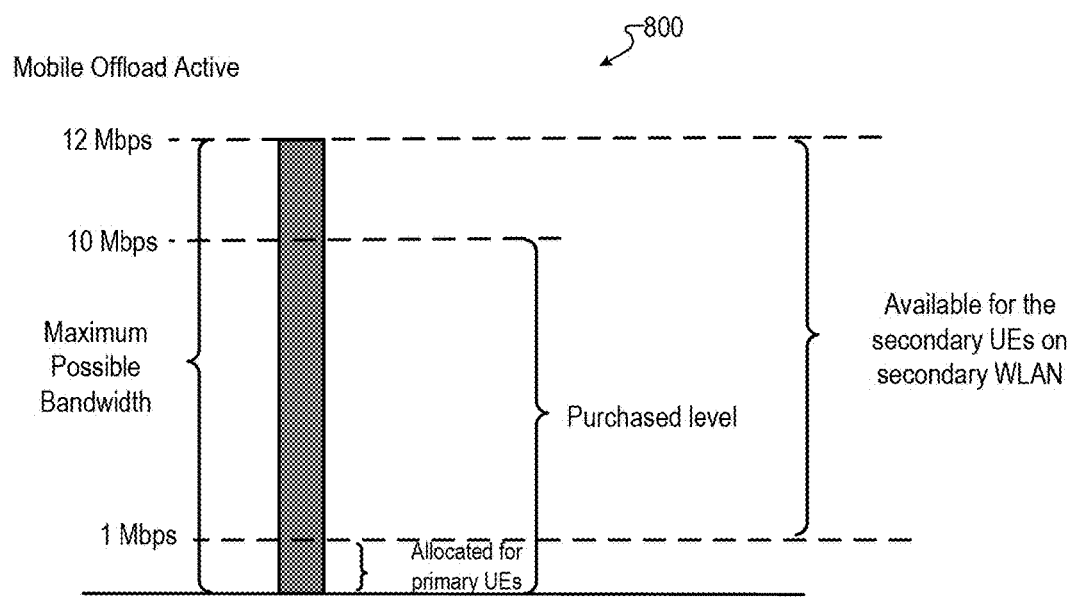

In the example of FIG. 8, referring to graph 800, consider a maximum possible bandwidth for the communications link between the CPE and the fixed packet network that is determined to be 12 Mbps, and that the amount of bandwidth purchased by the primary subscriber identity is 10 Mbps. In this example, the primary subscriber identity is not home and the primary network has zero usage by primary UEs. In this case, only a small amount of bandwidth is allocated to the primary sub-net (in case someone suddenly starts using it). Assuming that mobile offload is active (e.g., the communications service provider desires to have more usage offloaded from the mobile network to the fixed packet network), secondary UEs on the secondary SSID (e.g., secondary WLAN) could use all remaining bandwidth (here, 11 Mbps). The secondary SSID might be able to use even more bandwidth than the threshold purchased bandwidth (e.g., 10 Mbps), if the connection to the ISP supports it (here, it does—the total maximum bandwidth can be 12 Mbps). So long as there is no usage on the primary network, there is no need to temporarily offer the UEs on the primary network more throughput. Only if the primary network suddenly starts exhibiting bandwidth usage, might tests be run to determine if more allocation to the primary network is needed, which would decrease the amount of available bandwidth to the secondary UEs.

Figure 9:
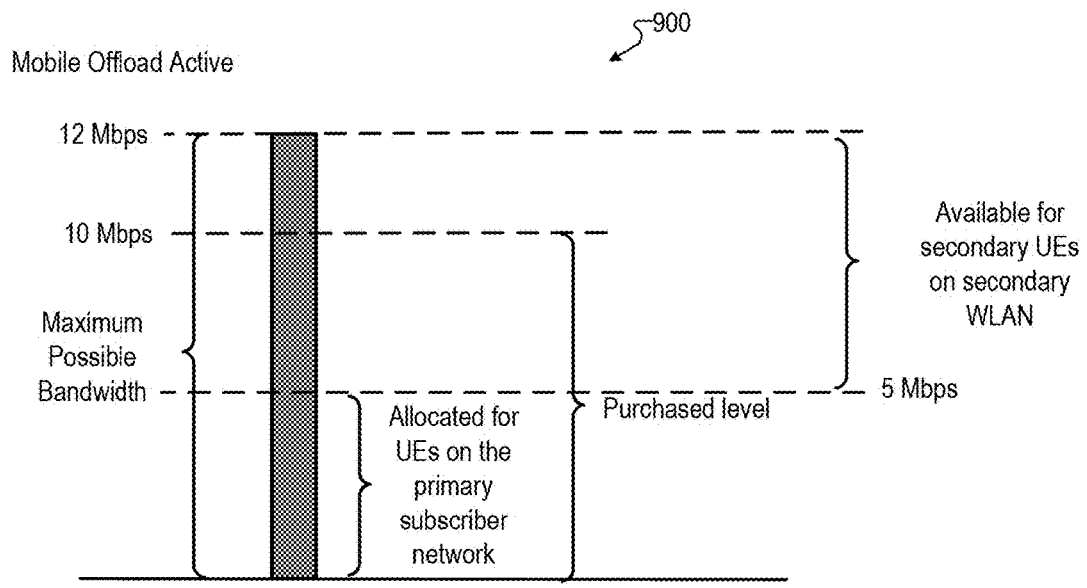
Figure 9:
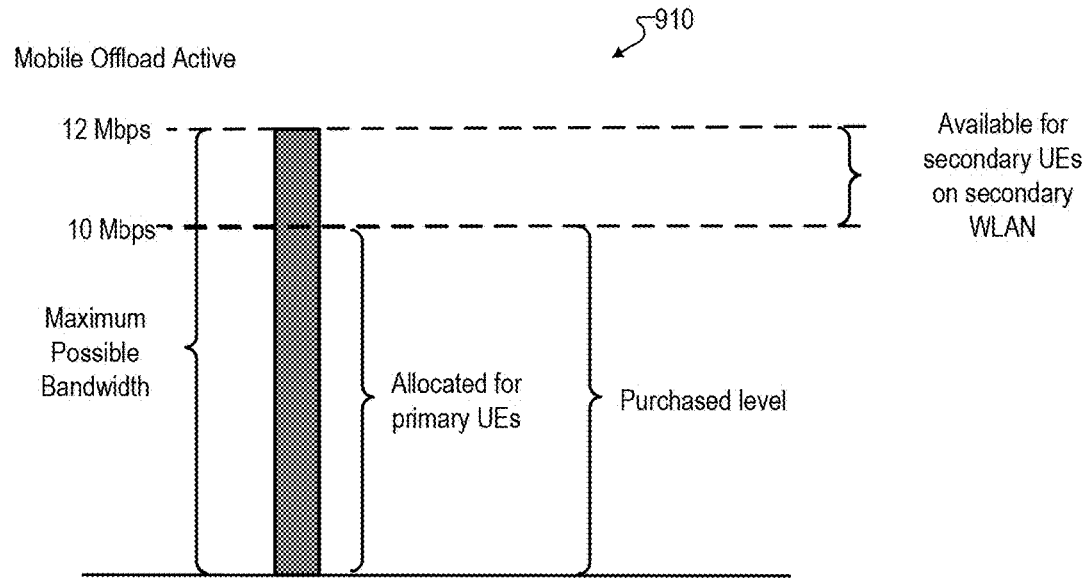

In FIG. 9, referring to graph 900, in another example in which offloading is desired, the primary UEs are allocated nominally half of the purchased bandwidth (e.g., half of the purchased 10 Mbps). As mentioned above, the primary network UEs can be allocated bandwidth based on the amount of bandwidth used on the primary network over a sampled period of time (more heavily weighted to more recent samples), plus a bandwidth overhead margin to account for short-term demand deviations. Devices connected to the secondary WLAN would use all remaining bandwidth (in the scenario shown, 7 Mbps). Graph 910 provides an illustration whereby during offload times, the allocation to primary UEs would not exceed the amount of bandwidth purchased by the subscriber identity (e.g., referring to graph 910, this purchased level is 10 Mbps). This is distinguished from the scenario in FIG. 7, in which primary UEs can be allocated amounts that exceed the purchased level. Referring to graph 910, if the allocation for the primary UEs cannot by this rule exceed 10 Mbps, then this would leave available, in this example, a bandwidth of 2 Mbps for connections through the secondary WLAN.

Figure 10:
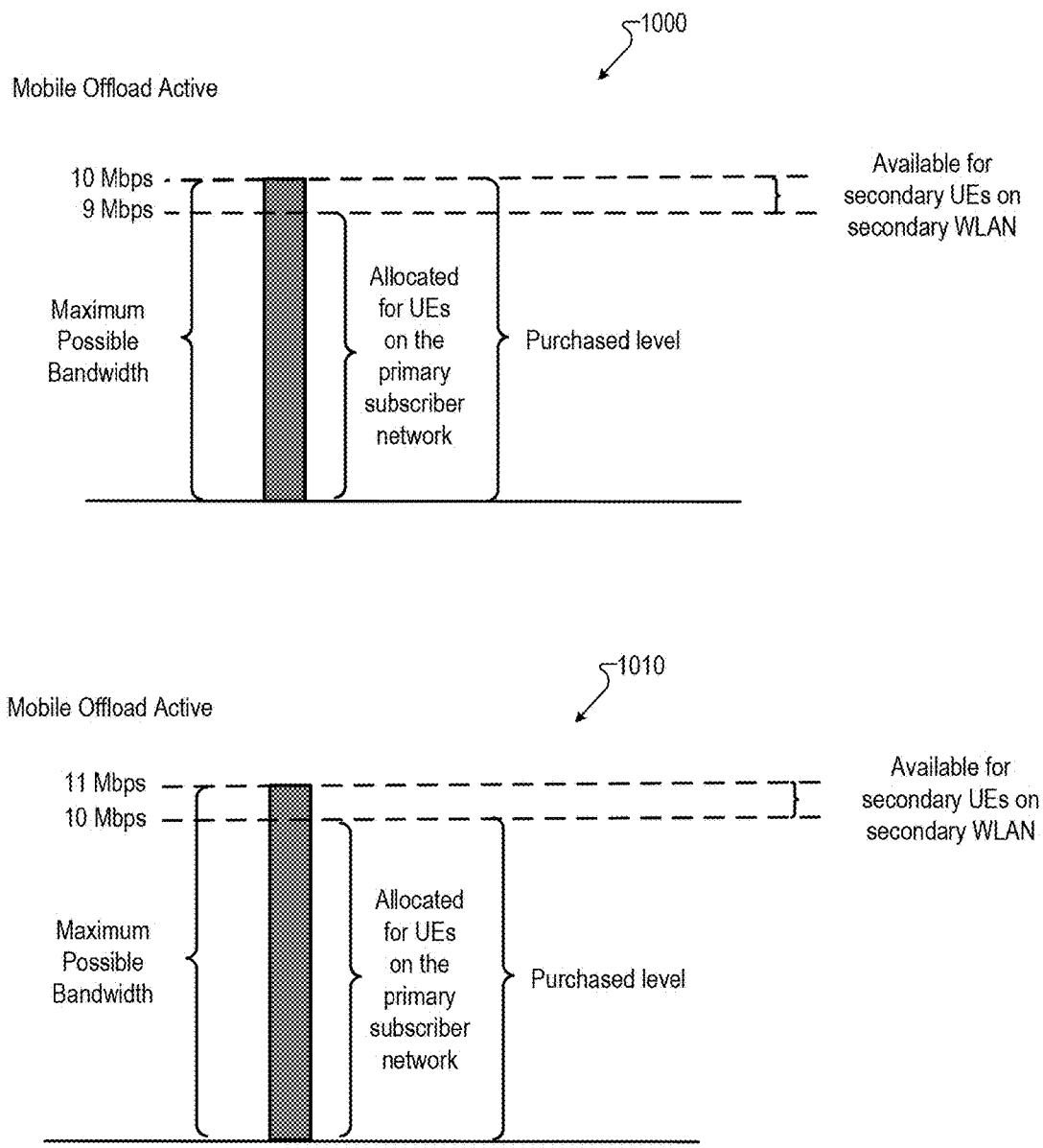

FIG. 10 shows two examples (graph 1000, graph 1010) whereby if the bandwidth allocated for the secondary WLAN drops below a prescribed threshold preferable to maintaining adequate speed, the CPE may temporarily block access grants to additional devices (e.g., not allowing secondary UEs to connect to the secondary WLAN). It may also suspend broadcast of the secondary WLAN, thereby allowing other mobile devices to search for other WIFI opportunities. In example graph 1000, the maximum bandwidth on the CPE-fixed packet network link is 10 Mbps, which is also the purchased level of bandwidth by the primary subscriber identity. If the primary UEs are allocated 9 Mbps, then the remainder (1 Mbps) can be allocated to secondary UEs. If more than one secondary UE connects to the secondary WLAN, then the UE's can all share the remaining available bandwidth. However, with a multitude of devices sharing 1 Mbps, each secondary UE that is added can result in a drop of allocated bandwidth for each secondary UE on the secondary WLAN, to the point that the allocated bandwidth may drop below the prescribed threshold preferable to maintaining adequate speed. In this scenario, in response to a determination that allocations to each secondary WLAN might drop the allocation for each secondary UE below the prescribed threshold, the CPE (e.g., the wireless module of the CPE) can refuse any further requests to connect to the secondary WLAN from any more secondary UEs. Graph 1010 presents a similar example scenario, whereby allocated bandwidth, when mobile offload is active, has already reached the purchased level of the primary subscriber identity. Here, the maximum possible bandwidth is 11 Mbps, so, similar to the example of graph 1010, 1 Mbps is available to be allocated to secondary UEs.

Figure 11:
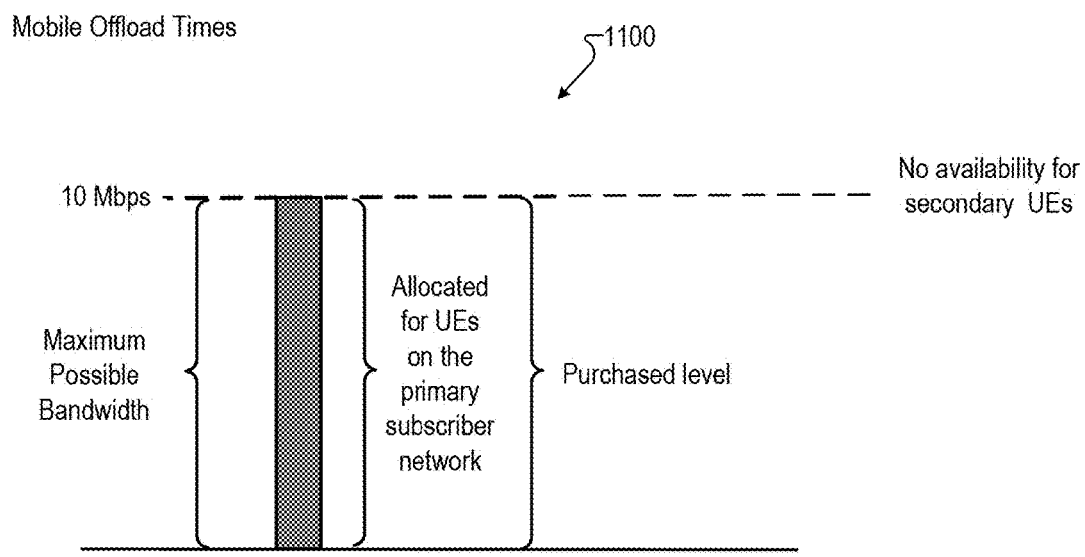

In FIG. 11, as shown in example graph 1100, the maximum possible bandwidth, the allocated bandwidth to primary UEs, and the purchase level of the subscriber identity are all 10 Mbps. In this example scenario, there would be no currently available bandwidth for any secondary UEs. If the maximum possible bandwidth should increase, or if the bandwidth allocation to the primary UEs should decrease, then enough excess bandwidth might be freed up to allow for secondary UEs to join the secondary WLAN and be allocated bandwidth.

Thus, as described above, the offload of the bandwidth usage of the secondary subscriber UEs from the mobile network to the fixed packet network can be transparent to the primary subscriber identity and its UEs. Excess bandwidth can be made available to secondary UEs, while a primary subscriber's UEs are able to obtain bandwidth at a level that the subscriber identity purchased.

In accordance with some example embodiments, a customer premises equipment having Wi-Fi routing functionality, or in other embodiments a wireless router, can be operable to perform example methods and operations, as illustrated in flow diagrams as described in FIGS. 12-15 in accordance with various aspects and embodiments of the subject disclosure. Additionally, machine-readable storage medium, comprising executable instructions that, when executed by a processor, can also facilitate performance of the methods and operations described in FIGS. 12-15.

Figure 12:
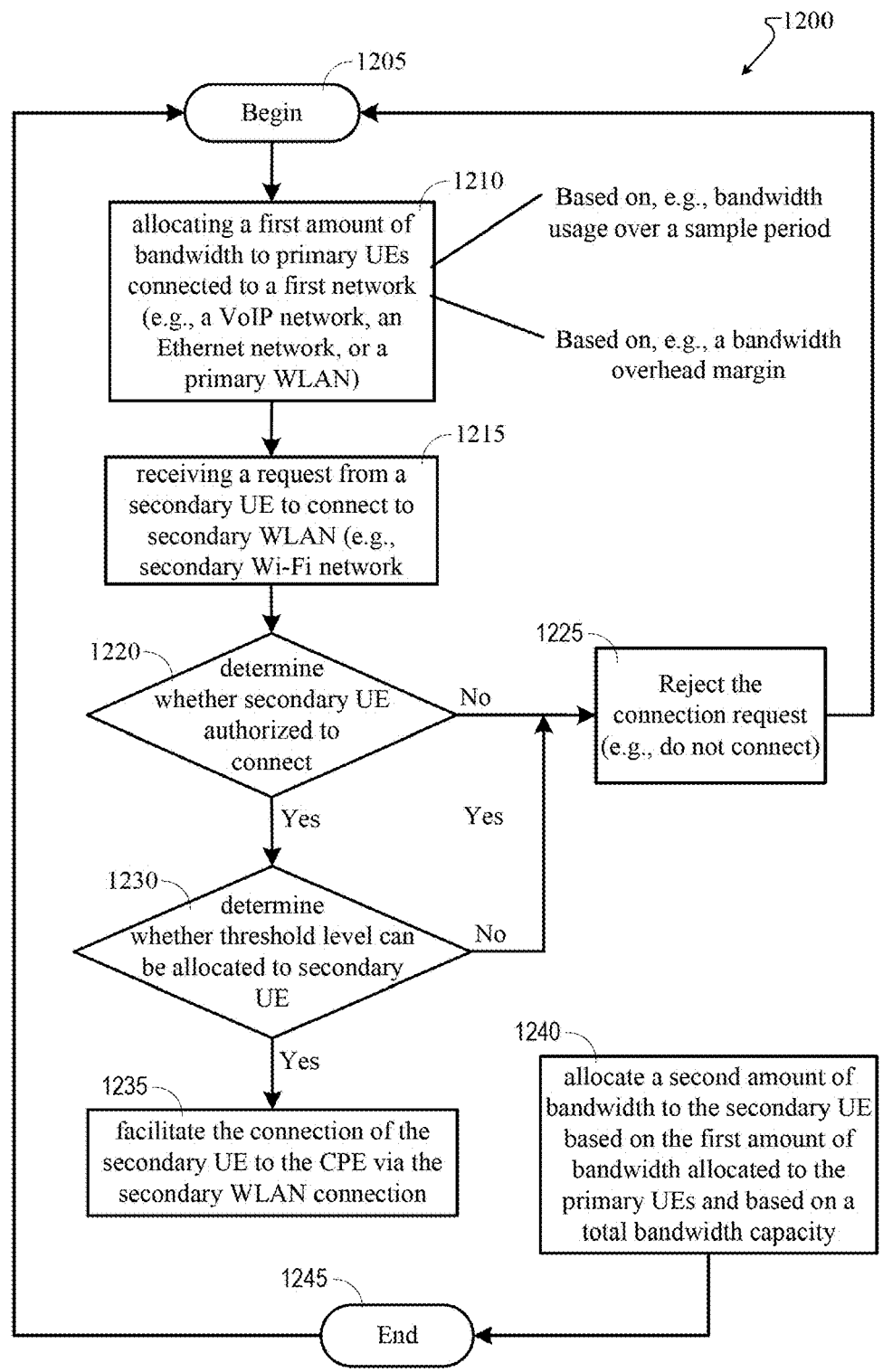
FIGS. 12-15 show example flow charts describing operations that can be performed, in accordance with various aspects and embodiments of the subject disclosure.

In non-limiting embodiments (also referred to as example embodiments), as shown in FIG. 12, a method 1200 can be performed by a customer premises equipment (e.g., CPE 220). In example embodiments, the CPE can comprise a wireless router, or wireless routing functionality. In example embodiments, the CPE can comprise a wireline port (e.g., an Ethernet port, USB port, etc.).

The method 1200 can begin at step 1205. At step 1210, the method 1200 can comprise allocating a first amount of bandwidth to primary user equipment (e.g., one or more UEs $102_{2\text{-}4}$ of FIG. 6) connected to the CPE (e.g., CPE-Ethernet connection 615, primary WLAN connection $620_2$, primary WLAN connection $620_1$, etc.) of a first network. The first network can comprise, e.g., a VoIP network, an Ethernet network, or a primary WLAN (wherein the primary WLAN can be, for example, a Wi-Fi network, or subnetwork). In example embodiments, there can be more than one primary Wi-Fi networks, or subnetworks. Thus, the first network can comprise the CPE and the primary UEs (e.g., one or more primary UEs).

Still referring to step 1210, the first amount of bandwidth can be based on a usage of bandwidth enabled by the CPE on behalf of the primary UEs over a sample period (as mentioned above, each of the primary UEs share bandwidth on the primary network). The first amount of bandwidth can also be based upon, for example, on a bandwidth overhead margin to account for an event in which the primary UEs increase demand for bandwidth from the CPE. In example embodiments, the first amount of bandwidth does not exceed a level of bandwidth specific to a subscriber account of a primary subscriber identity associated with the CPE (e.g., a level of bandwidth purchased).

The method 1200, at step 1215, can receive a request, from a secondary user equipment (e.g., UE $102_5$, $102_6$, $102_7$, etc.) to connect to the CPE via a wireless connection (e.g., secondary WLAN connection 625) of a second network that comprises a wireless local area network (e.g., a secondary Wi-Fi network, or subnetwork) that is associated with the CPE. In example embodiments, one or more secondary Wi-Fi networks, or subnetworks can allow for one or more secondary UEs to connect. The secondary UE can be associated with a secondary subscriber identity that is not associated with the subscriber account of the primary subscriber identity. For example, the secondary subscriber identity does not own the CPE, nor does the secondary subscriber identity rent the CPE from the communications services provider entity that operates the fixed packet network (e.g., fixed packet network 210) to which the CPE is connected (e.g., connected via CPE-fixed packet network connection 605).

At step 1220, the CPE can be operable to determine whether the secondary UE is authorized to connect to the CPE via the secondary wireless network connection. In response to a determination by the CPE that the secondary UE is not authorized to connect, then at step 1225 the connection request by the secondary UE can be refused. In response to a determination by the CPE that the secondary UE is authorized to connect (for example, if the CPE receives an authentication, which can be based on a verification with one or more servers of the fixed packet network having access to customer account information that the secondary subscriber entity is a subscriber of the fixed packet network) then the method 1200 can move to step 1225.

At step 1230, a determination can be made as to whether a threshold level of bandwidth is able to be allocated to the secondary UE. As described with respect to FIG. 10, even if there was available bandwidth, the amount of bandwidth might not yield a satisfactory amount of bandwidth for the secondary UE, which can cause, for example, lag in downloads, etc. Additionally, as described with respect to FIG. 11, excess bandwidth might not be available at all. In response to a determination, by the CPE, that a threshold level of bandwidth is not able to be allocated to the secondary UE, the method can move to step 1225, wherein the connection request is rejected (e.g., the CPE does not allow the secondary UE to connect). In response to a determination, by the CPE, that a threshold level of bandwidth is able to be allocated to the secondary UE, the method can move to step 1235.

In some example embodiments, a determination can be made whether a threshold level of bandwidth can be allocated to a secondary UE prior to determining whether the secondary UE is authorized to connect to the CPE. As mentioned above, the CPE can refuse connections, or in some embodiments, simply not broadcast that the secondary Wi-Fi network is available for connection. After rejections of secondary UE requests, the CPE can proceed to the beginning of the method at step 1205.

At step 1235, the CPE can facilitate the connection of the secondary UE to the CPE via the secondary WLAN.

After requests for bandwidth by the secondary UE, the CPE can at step allocate a second amount of bandwidth to the secondary UE, wherein the second amount of bandwidth is allocated based on the first amount of bandwidth allocated to the primary UEs and based on a total bandwidth capacity (also referred to as maximum possible bandwidth) for transmissions between the customer premises equipment and a network node device (e.g., CMTS, DSLAM, etc.) of the fixed packet network. In some non-limiting embodiments, the second amount is representative (or largely representative) of a difference between the total bandwidth capacity and the amount allocated to the primary UEs connected to the first network (e.g., as described in step 1210 above), wherein the amount allocated to the primary UEs can be an amount that does not exceed the level of bandwidth purchased by the primary subscriber identity associated with the primary UEs. The method 1200 can end at step 1245, and begin again at step 1205.

Figure 13:
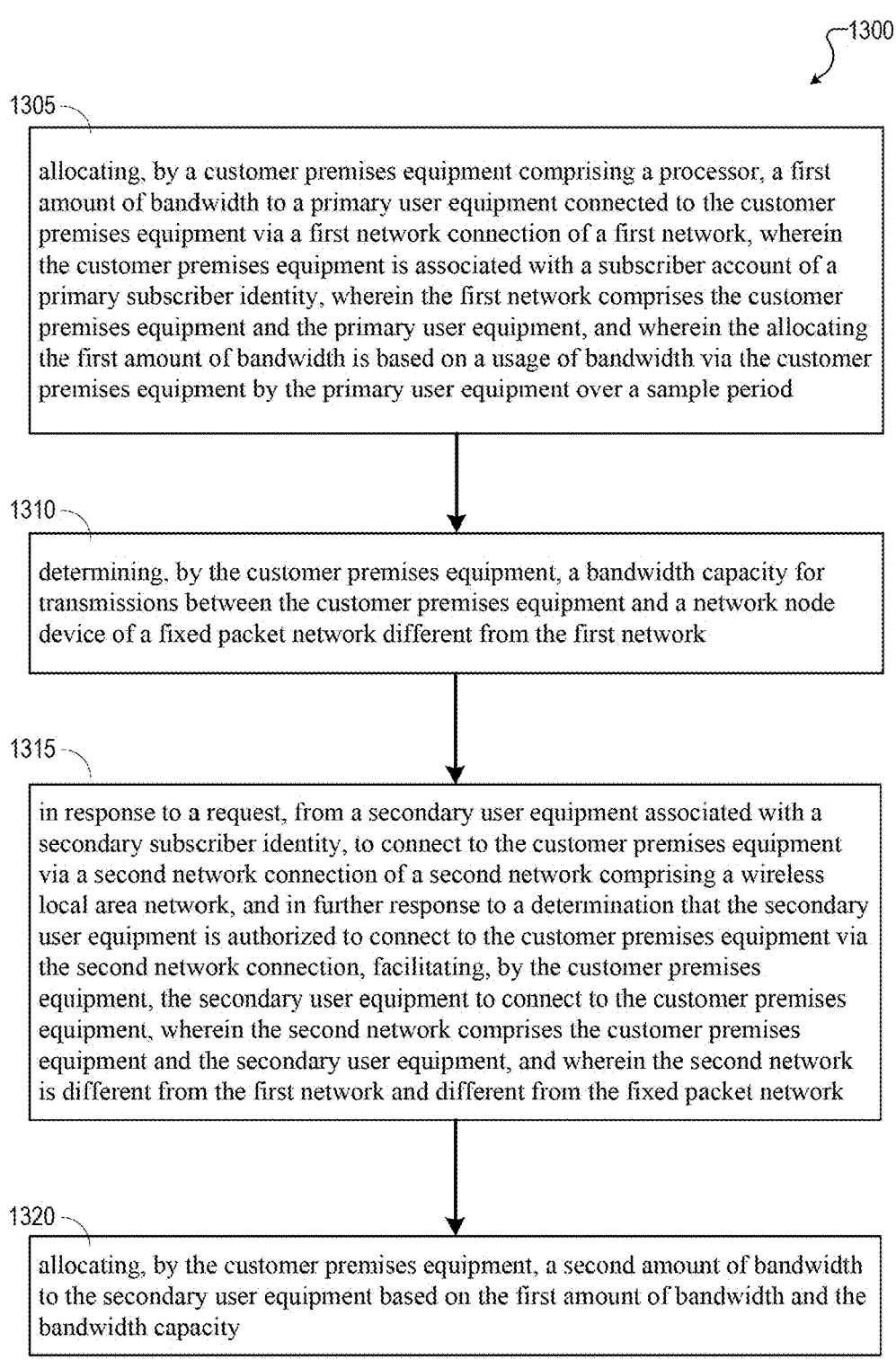

In non-limiting embodiments, as shown in FIG. 13, an example method 1300 can comprise, at step 1305, allocating, by a customer premises equipment (e.g., CPE 220) comprising a processor, a first amount of bandwidth to a primary user equipment (e.g., UE $102_{2-4}$ of FIG. 6) connected to the customer premises equipment via a first network connection (e.g., CPE-Ethernet connection 615, primary WLAN connection $620_2$, primary WLAN connection $620_1$, etc.) of a first network. The customer premises equipment can be, for example, a broadband access modem (e.g., cable modem, DSL modem, satellite modem, etc.), a telephony modem (e.g., an EMTA, DSL telephony gateway, etc.) gateway device, etc. The customer premises equipment can comprise wireless routing functionality (e.g., a wireless component, such as a wireless router). The customer premises equipment can be associated with a subscriber account (the information of which can be stored in, e.g., customer account information database 635) of a primary subscriber identity. The allocating the first amount of bandwidth can be based on a usage of bandwidth via the customer premises equipment by the primary user equipment over a sample period. The first network can comprise the customer premises equipment and the primary user equipment. The first network can comprise a wired network (e.g., an Ethernet network), a wireless network (e.g., a Wi-Fi network), or a VoIP network (e.g., the customer premises equipment and a landline telephone).

The method 1300 can further comprise, at step 1310, determining, by the customer premises equipment, a bandwidth capacity (e.g., total bandwidth capacity, maximum possible bandwidth, etc.) for transmissions between the customer premises equipment and a network node device (e.g., a CMTS, DSLAM, etc.) of a fixed packet network (e.g., fixed packet network 210, which can be a cable broadband network operating according to DOCSIS standards, a telephone DSL network, etc.) different from the first network.

Still on FIG. 13, the method 1300 can further comprise, at step 1315, in response to a request, from a secondary user equipment (e.g., UE $102_5$, $102_6$, $102_7$, etc.) associated with a secondary subscriber identity, to connect to the customer premises equipment via a second network connection (e.g. secondary WLAN connection 625) of a second network comprising a wireless local area network (e.g., a second Wi-Fi network, or subnetwork), and in further response to a determination that the secondary user equipment is authorized to connect to the customer premises equipment via the second network connection, facilitating, by the customer premises equipment, the secondary user equipment to connect to the customer premises equipment. The second network can comprise the customer premises equipment and the secondary user equipment, and the second network is different from the first network and different from the fixed packet network.

The method 1300 can comprise allocating, by the customer premises equipment, a second amount of bandwidth to the secondary user equipment based on the first amount of bandwidth and the bandwidth capacity.

In non-limiting example embodiments, the subscriber account can be a first subscriber account, and the customer premises equipment is not associated with a second subscriber account of the secondary subscriber identity, and the secondary subscriber identity has not purchased a level of bandwidth allocated by the customer premises equipment. Additionally, the allocating the first amount of bandwidth is further based on a bandwidth overhead margin to account for an event in which the primary user equipment increases demand for bandwidth to be allocated by the customer premises equipment. For example, if there are short-term demand deviations, such as a sudden increase in demand by the primary user equipment.

The method 1300 can further comprise, prior to the step of facilitating the secondary user equipment to connect to the customer premises equipment via the second network connection of the second network, determining, by the customer premises equipment, whether a threshold level of bandwidth is able to be allocated to the secondary user equipment. As described in FIG. 10, even if there was available bandwidth, the amount might not yield enough bandwidth for the secondary UE, which can cause, for example, lag in downloads, etc.

In some example embodiments, determining the first amount of bandwidth comprises determining the first amount of bandwidth does not exceed a level of bandwidth specific to the primary subscriber identity. This level of bandwidth can be, for example, the amount of bandwidth that the primary subscriber identity purchased.

Figure 14:
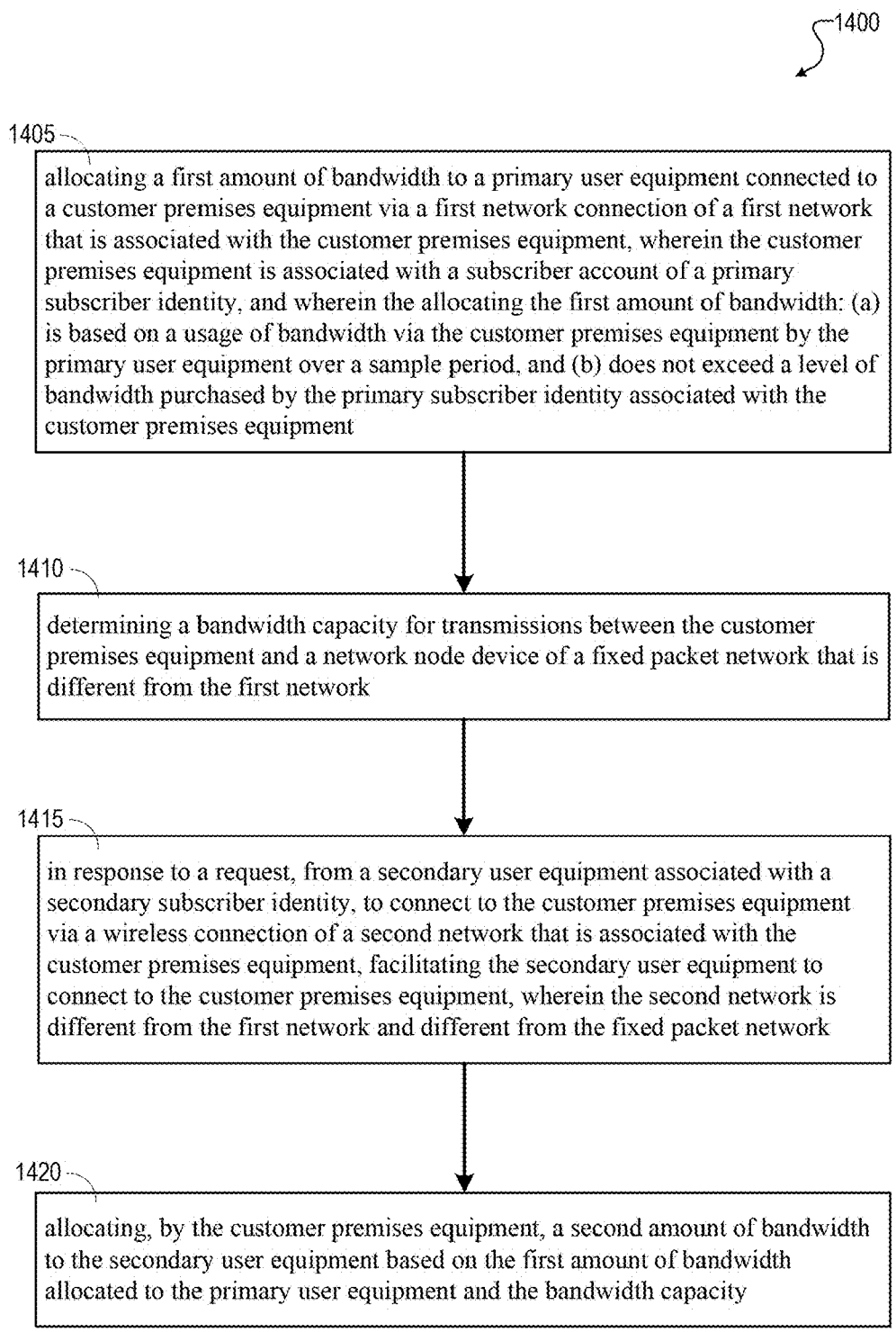

In non-limiting embodiments, a customer premises equipment (e.g., CPE $220_2$ of FIG. 6), comprising a processor and a memory that stores executable instructions that, when executed by the processor, facilitate performance of example operations 1400 as shown in FIG. 14. The operations 1400 can comprise, at step 1405, allocating a first amount of bandwidth to a primary user equipment (e.g., UE $102_{2-4}$ of FIG. 6) connected to a customer premises equipment via a first network connection (e.g., CPE-Ethernet connection 615, primary WLAN connection $620_2$, primary WLAN connection $620_1$, etc.) of a first network that is associated with the customer premises equipment, wherein the customer premises equipment is associated with a subscriber account of a primary subscriber identity (the information of which can be stored in, e.g., customer account information database 635), and wherein the allocating the first amount of bandwidth: (a) can be based on a usage of bandwidth via the customer premises equipment by the primary user equipment over a sample period, and (b) does not exceed a level of bandwidth purchased by the primary subscriber identity associated with the customer premises equipment.

The operations 1400 can comprise, at step 1410, determining a bandwidth capacity for transmissions between the customer premises equipment and a network node device (e.g., CMTS, DSLAM, etc.) of a fixed packet network (e.g., DOCSIS cable network, DSL network, satellite Internet network, etc.) that is different from the first network. The first network can comprise a wired network (e.g., an ethernet network), a wireless network (e.g., a Wi-Fi network), or a VoIP network (e.g., the customer premises equipment and a landline telephone).

The operations 1400 can comprise, at step 1415, in response to a request, from a secondary user equipment (e.g., UE $102_5$, $102_6$, $102_7$, etc.) associated with a secondary subscriber identity, to connect to the customer premises equipment via a wireless connection (e.g. secondary WLAN connection 625) of a second network that is associated with the customer premises equipment (e.g., a second Wi-Fi network, or subnetwork, of the customer premises equipment), facilitating the secondary user equipment to connect to the customer premises equipment, wherein the second network is different from the first network and different from the fixed packet network.

Still referring to FIG. 14, the operations 1400 can further comprise, at step 1420, allocating, by the customer premises equipment, a second amount of bandwidth to the secondary user equipment based on the first amount of bandwidth allocated to the primary user equipment and the bandwidth capacity.

In non-limiting embodiments, referring to FIG. 14, the subscriber account can be a first subscriber account, wherein the customer premises equipment is not associated with a second subscriber account of the secondary subscriber identity, and wherein the secondary subscriber identity has not purchased the level of bandwidth purchased by the primary subscriber identity associated with the customer premises equipment. The operations 1400 can further comprise, prior to allowing the secondary user equipment to connect to the customer premises equipment, receiving an authentication that the secondary user equipment is authorized to connect to the customer premises equipment. In example embodiments, the first amount of bandwidth can further be based on a bandwidth overhead margin to account for an event in which the primary user equipment increases demand for bandwidth to be allocated by the customer premises equipment. For example, if there are short-term demand deviations, such as a sudden increase in demand by the primary user equipment.

In non-limiting embodiments, the operations 1400 can further comprise, prior to the facilitating the secondary user equipment to connect to the customer premises equipment via the second network connection, determining whether a threshold level of bandwidth is able to be allocated to the secondary user equipment. As described in FIG. 10 above, even if there was available bandwidth, the amount might not yield an appropriate amount of bandwidth for the secondary user equipment, which can cause, for example, lag in downloads, etc.

Figure 15:
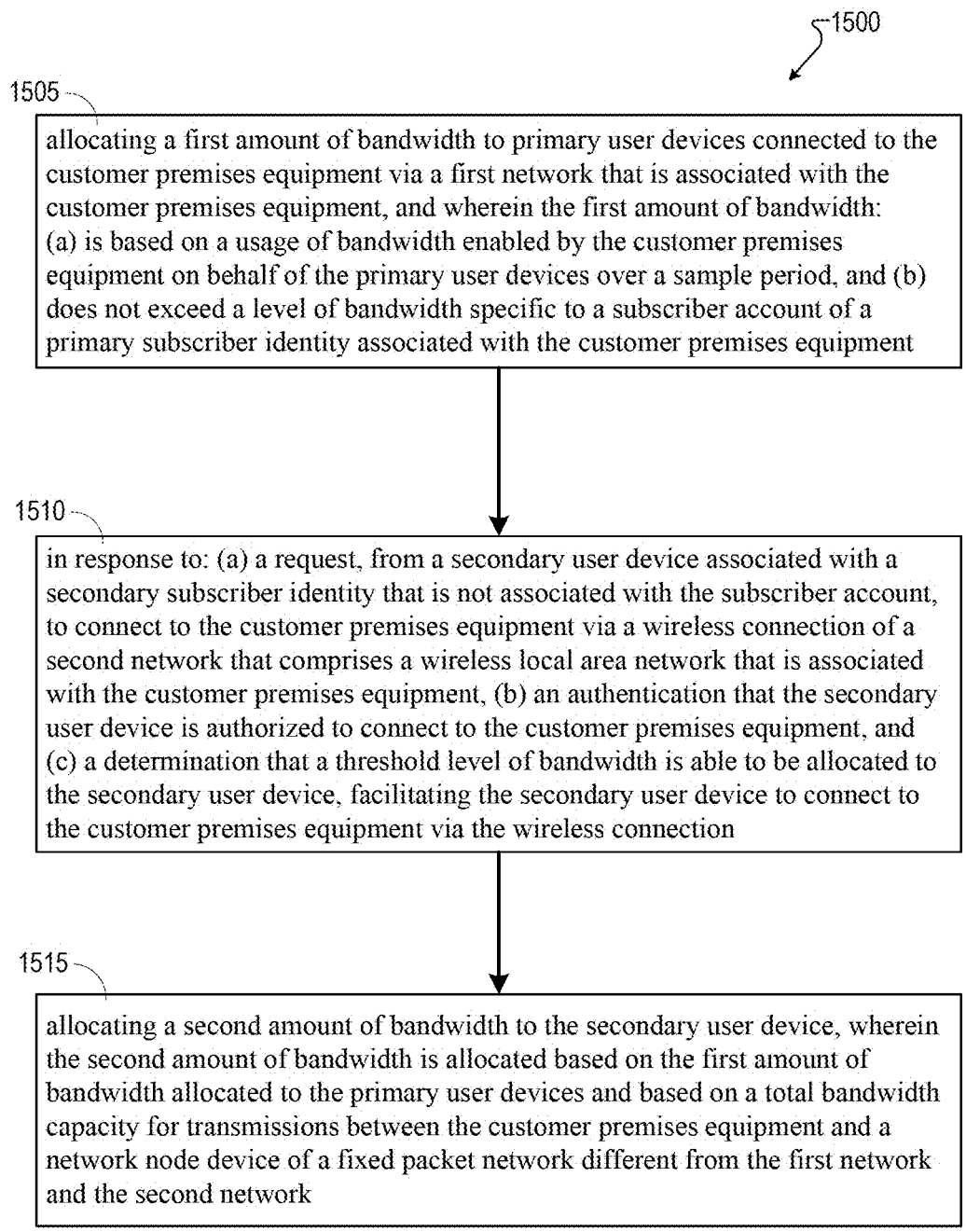

In non-limiting embodiments, a customer premises equipment (e.g., CPE 220) is provided, comprising a processor and a memory that stores executable instructions that, when executed by the processor, facilitate performance of operations 1500 as shown in FIG. 15. As shown at step 1505, the operations can comprise allocating a first amount of bandwidth to primary user devices (e.g., UE $102_{2-4}$ of FIG. 6 above) connected to the customer premises equipment via a first network associated with the customer premises equipment. The first amount of bandwidth can be based on a usage of bandwidth enabled by the customer premises equipment on behalf of the primary user devices over a sample period. The first amount of bandwidth can be an amount that does not exceed a level of bandwidth specific to a subscriber account (e.g., a level of bandwidth purchased) of a primary subscriber identity associated with the customer premises equipment.

The operations 1500 can further comprise, at step 1510, in response to: (a) a request, from a secondary user device (e.g., UE $102_5$, $102_6$, $102_7$, etc.) associated with a secondary subscriber identity that is not associated with the subscriber account, to connect to the customer premises equipment via a wireless connection of a second network that comprises a wireless local area network (e.g., a secondary Wi-Fi network, or subnetwork) that is associated with the customer premises equipment, (b) an authentication that the secondary user device is authorized to connect to the wireless router, and (c) a determination that a threshold level of bandwidth is able to be allocated to the secondary user device, facilitating, by the wireless router, the secondary user device to connect to the wireless router via the wireless connection.

The operations 1500 can further comprise, at step 1515, allocating a second amount of bandwidth to the secondary user device, wherein the second amount of bandwidth is allocated based on the first amount of bandwidth allocated to the primary user devices and based on a total bandwidth capacity for transmissions between the customer premises equipment and a network node device of a fixed packet network different from the first network and the second network.

In non-limiting embodiments, the first amount of bandwidth can also be based on a bandwidth overhead margin to account for an event in which the primary user devices increase demand for bandwidth from the customer premises equipment. The customer premises equipment can comprise a wireless router (or a wireless router component, wireless routing functionality, etc.), and the first network can comprise a wireless network (e.g., a primary Wi-Fi network, or subnetwork). Additionally, the customer premises equipment can comprise an Ethernet port, and the first network can also comprise an Ethernet network.

Figure 16:
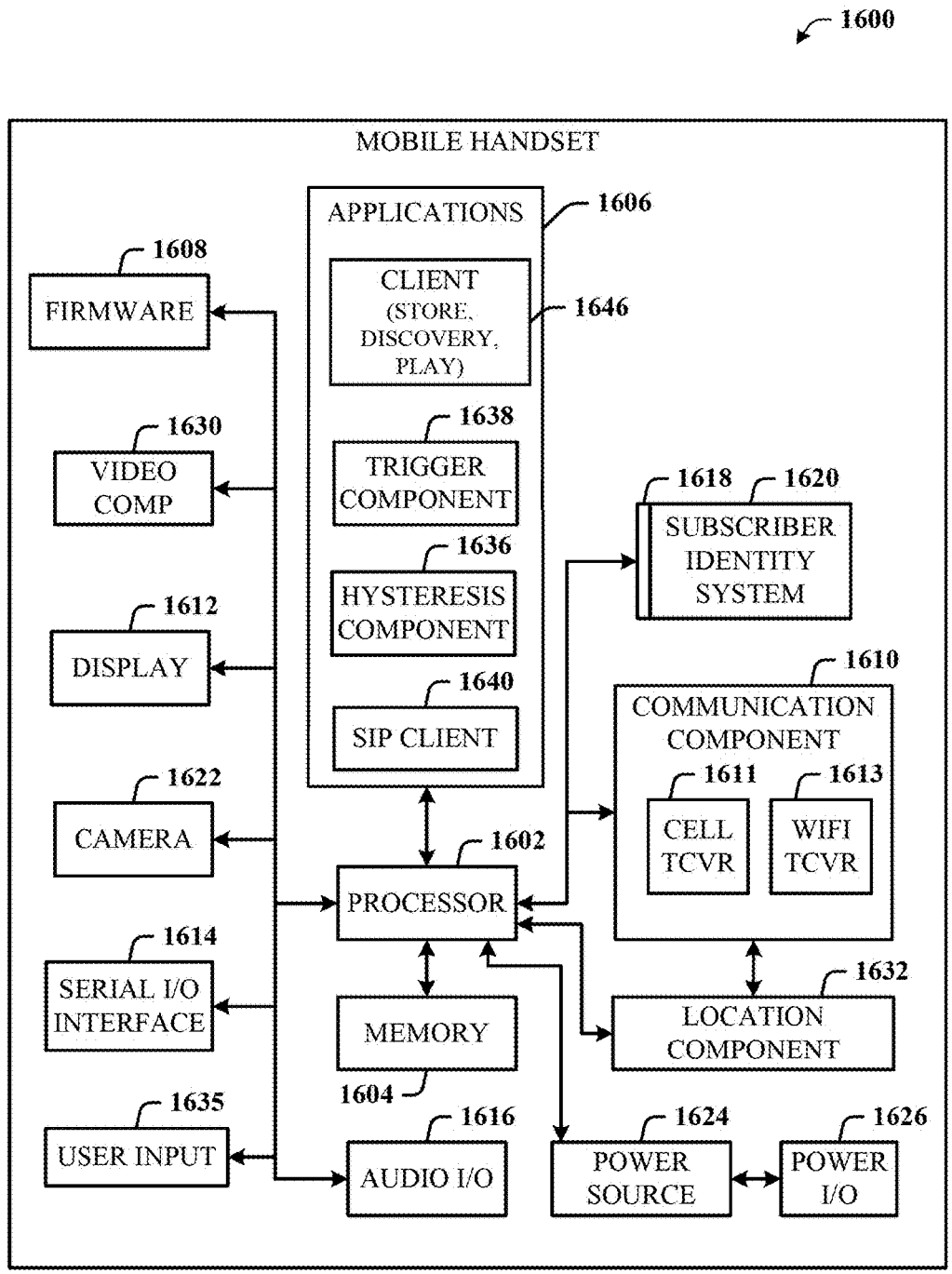
FIG. 16 illustrates an example block diagram of an example mobile handset (which can be a UE), in accordance with various aspects and embodiments of the subject disclosure.

Referring now to FIG. 16, illustrated is a schematic block diagram of a user equipment (e.g., UE 102, etc.) that can be a mobile device (e.g., handset) 1600 capable of connecting to a network in accordance with some embodiments described herein. Although a mobile handset 1600 is illustrated herein, it will be understood that the mobile device can be other devices as well, and that the mobile handset 1600 is merely illustrated to provide context for the embodiments of the various embodiments described herein. The following discussion is intended to provide a brief, general description of an example of a suitable environment 1600 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1600 includes a processor 1602 for controlling and processing all onboard operations and functions. A memory 1604 interfaces to the processor 1602 for storage of data and one or more applications 1606 (e.g., a video player software, user feedback component software, etc.). Other applications can include voice recognition of predetermined voice commands that facilitate initiation of the user feedback signals. The applications 1606 can be stored in the memory 1604 and/or in a firmware 1608, and executed by the processor 1602 from either or both the memory 1604 or/and the firmware 1608. The firmware 1608 can also store startup code for execution in initializing the handset 1600. A communications component 1610 interfaces to the processor 1602 to facilitate wired/wireless communication with external systems, e.g., cellular networks, VoIP networks, and so on. Here, the communications component 1610 can also include a suitable cellular transceiver 1611 (e.g., a global GSM transceiver) and/or an unlicensed transceiver 1613 (e.g., Wi-Fi, WiMax) for corresponding signal communications. The handset 1600 can be a device such as a cellular telephone, a PDA with mobile communications capabilities, and messaging-centric devices. The communications component 1610 also facilitates communications reception from terrestrial radio networks (e.g., broadcast), digital satellite radio networks, and Internet-based radio services networks.

The handset 1600 includes a display 1612 for displaying text, images, video, telephony functions (e.g., a Caller ID function), setup functions, and for user input. For example, the display 1612 can also be referred to as a "screen" that can accommodate the presentation of multimedia content (e.g., music metadata, messages, wallpaper, graphics, etc.). The display 1612 can also display videos and can facilitate the generation, editing and sharing of video quotes. A serial I/O interface 1614 is provided in communication with the processor 1602 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1600, for example. Audio capabilities are provided with an audio I/O component 1616, which can include a speaker for the output of audio signals related to, for example, indication that the user pressed the proper key or key combination to initiate the user feedback signal. The audio I/O component 1616 also facilitates the input of audio signals through a microphone to record data and/or telephony voice data, and for inputting voice signals for telephone conversations.

The handset 1600 can include a slot interface 1618 for accommodating a SIC (Subscriber Identity Component) in the form factor of a card Subscriber Identity Module (SIM) or universal SIM 1620, and interfacing the SIM card 1620 with the processor 1602. However, it is to be appreciated that the SIM card 1620 can be manufactured into the handset 1600, and updated by downloading data and software.

The handset 1600 can process IP data traffic through the communication component 1610 to accommodate IP traffic from an IP network such as, for example, the Internet, a corporate intranet, a home network, a person area network, etc., through an ISP or broadband cable provider. Thus, VoIP traffic can be utilized by the handset 1600 and IP-based multimedia content can be received in either an encoded or decoded format.

A video processing component 1622 (e.g., a camera) can be provided for decoding encoded multimedia content. The video processing component 1622 can aid in facilitating the generation, editing and sharing of video quotes. The handset 1600 also includes a power source 1624 in the form of batteries and/or an AC power subsystem, which power source 1624 can interface to an external power system or charging equipment (not shown) by a power I/O component 1626.

The handset 1600 can also include a video component 1630 for processing video content received and, for recording and transmitting video content. For example, the video component 1630 can facilitate the generation, editing and sharing of video quotes. A location tracking component 1632 facilitates geographically locating the handset 1600. As described hereinabove, this can occur when the user initiates the feedback signal automatically or manually. A user input component 1634 facilitates the user initiating the quality feedback signal. The user input component 1634 can also facilitate the generation, editing and sharing of video quotes. The user input component 1634 can include such conventional input device technologies such as a keypad, keyboard, mouse, stylus pen, and/or touch screen, for example.

Referring again to the applications 1606, a hysteresis component 1636 facilitates the analysis and processing of hysteresis data, which is utilized to determine when to associate with the access point. A software trigger component 1638 can be provided that facilitates triggering of the hysteresis component 1638 when the Wi-Fi transceiver 1613 detects the beacon of the access point. A SIP client 1640 enables the handset 1600 to support SIP protocols and register the subscriber with the SIP registrar server. The applications 1606 can also include a client 1642 that provides at least the capability of discovery, play and store of multimedia content, for example, music.

The handset 1600, as indicated above related to the communications component 1610, includes an indoor network radio transceiver 1613 (e.g., Wi-Fi transceiver). This function supports the indoor radio link, such as IEEE 802.11, for the handset 1600. The handset 1600 can accommodate at least satellite radio services through a handset that can combine wireless voice and digital radio chipsets into a single handheld device.

Figure 17:
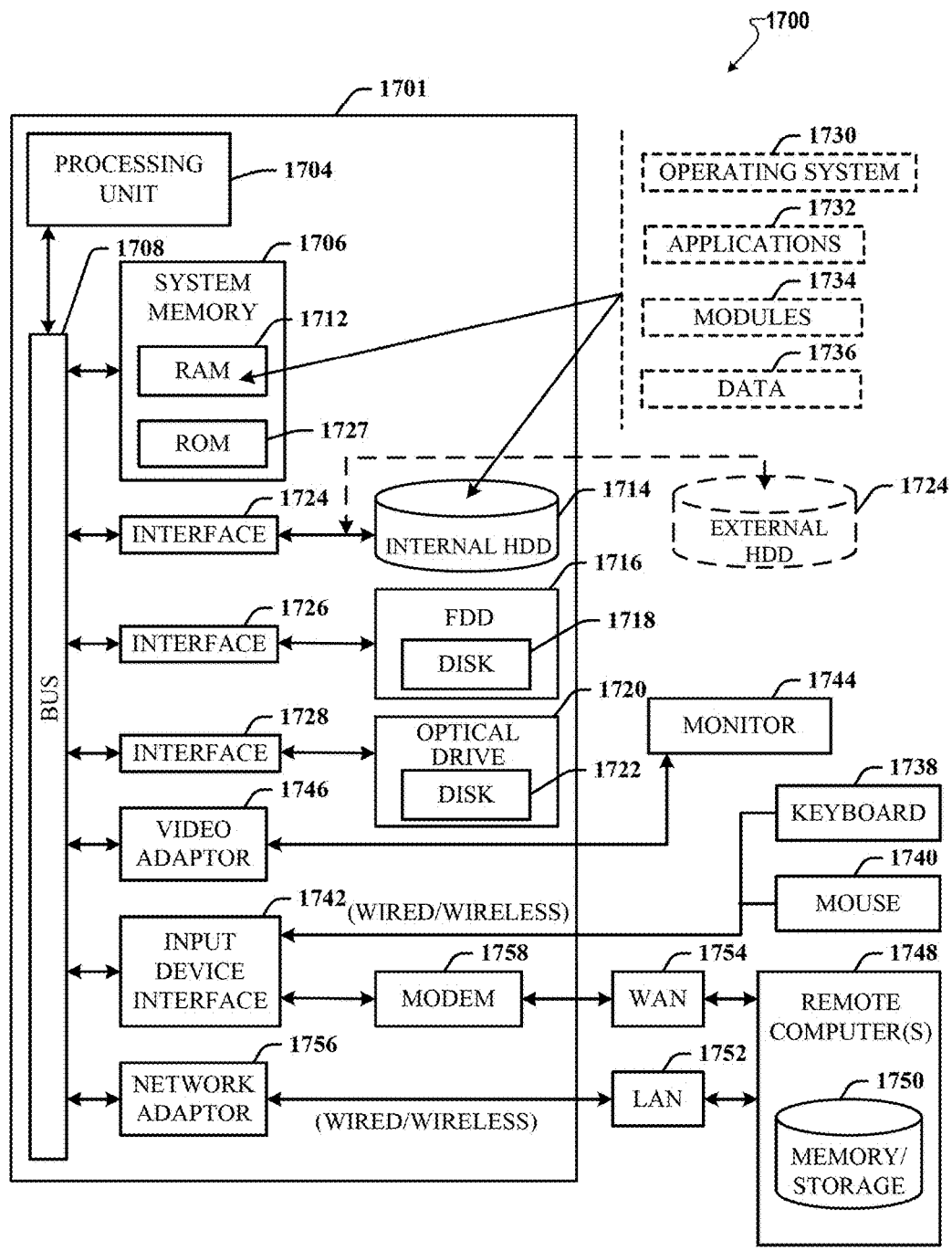
FIG. 17 illustrates an example block diagram of a computer (some of the components of which can be within a CPE) that can be operable to execute processes and methods, in accordance with various aspects and embodiments of the subject disclosure.

Referring now to FIG. 17, there is illustrated a block diagram of a computer 1700 operable to execute the functions and operations performed in the described example embodiments. For example, a network node (e.g., network node 104) may contain components as described in FIG. 17. The computer 1700 can provide networking and communication capabilities between a wired or wireless communication network and a server and/or communication device. In order to provide additional context for various aspects thereof, FIG. 17 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 17, implementing various aspects described herein with regards to devices can include a computer 1700, the computer 1700 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multiprocessor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes read-only memory (ROM) 1727 and random access memory (RAM) 1712. A basic input/output system (BIOS) is stored in a non-volatile memory 1727 such as ROM, EPROM, EEPROM, which BIOS contains the basic routines that help to transfer information between elements within the computer 1700, such as during start-up. The RAM 1712 can also include a high-speed RAM such as static RAM for caching data.

The computer 1700 further includes an internal hard disk drive (HDD) 1714 (e.g., EIDE, SATA), which internal hard disk drive 1714 can also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1700 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1700, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is to be appreciated that the innovation can be implemented with various commercially available operating systems or combinations of operating systems.

A user can enter commands and information into the computer 1700 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 2394 serial port, a game port, a USB port, an IR interface, etc.

A monitor 1744 or other type of display device is also connected to the system bus 1708 through an interface, such as a video adapter 1746. In addition to the monitor 1744, a computer 1700 typically includes other peripheral output devices (not shown), such as speakers, printers, etc.

The computer 1700 can operate in a networked environment using logical connections by wired and/or wireless communications to one or more remote computers, such as a remote computer(s) 1748. The remote computer(s) 1748 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1700 is connected to the local network 1752 through a wired and/or wireless communication network interface or adapter 1756. The adapter 1756 may facilitate wired or wireless communication to the LAN 1752, which may also include a wireless access point disposed thereon for communicating with the wireless adapter 1756.

When used in a WAN networking environment, the computer 1700 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 through the input device interface 1742. In a networked environment, program modules depicted relative to the computer, or portions thereof, can be stored in the remote memory/storage device 1750. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signalling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signalling-stream from a set of subscriber stations. Data and signalling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signalling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
allocating, by a customer premises equipment comprising a processor, a first amount of bandwidth to a primary user equipment connected to the customer premises equipment via a first network connection of a first network, wherein the customer premises equipment is associated with a first subscriber account of a primary subscriber identity, wherein the first network comprises the customer premises equipment and the primary user equipment, wherein the allocating the first amount of bandwidth is based on a usage of bandwidth via the customer premises equipment by the primary user equipment over a sample period, and wherein the first amount of bandwidth does not exceed a bandwidth level associated with the primary subscriber identity;
determining, by the customer premises equipment, a bandwidth capacity for transmissions between the customer premises equipment and a network node device of a fixed packet network different from the first network;
in response to a request, from a secondary user equipment associated with a secondary subscriber identity, to connect to the customer premises equipment via a second network connection of a second network comprising a wireless local area network, and in further response to a determination that the secondary user equipment is authorized to connect to the customer premises equipment via the second network connection and that at least a threshold bandwidth level is able to be allocated to the secondary user equipment, facilitating, by the customer premises equipment, the secondary user equipment to connect to the customer premises equipment, wherein the second network comprises the customer premises equipment and the secondary user equipment, wherein the second network is different from the first network and different from the fixed packet network, wherein the customer premises equipment is not associated with a second subscriber account of the secondary subscriber identity, and wherein the secondary subscriber identity has not purchased a level of bandwidth allocated by the customer premises equipment; and
allocating, by the customer premises equipment, a second amount of bandwidth to the secondary user equipment based on the first amount of bandwidth and the bandwidth capacity.

2. The method of claim 1, wherein the allocating the first amount of bandwidth is further based on a bandwidth overhead margin to account for an event in which the primary user equipment increases demand for bandwidth to be allocated by the customer premises equipment.

3. The method of claim 1, wherein the customer premises equipment comprises a wireless router, and wherein the first network comprises a wi-fi network.

4. The method of claim 1, wherein the first network comprises a wired network that is an ethernet network.

5. The method of claim 1, wherein the second network comprises a wi-fi network.

6. The method of claim 1, wherein the customer premises equipment comprises a broadband access modem.

7. The method of claim 1, wherein the customer premises equipment comprises a telephony modem.

8. The method of claim 1, further comprising, prior to allowing the secondary user equipment to connect to the customer premises equipment, receiving, by the customer premises equipment, an authentication that the secondary user equipment is authorized to connect to the customer premises equipment.

9. The method of claim 1, wherein the bandwidth level associated with the primary subscriber identity comprises a purchased bandwidth level purchased by the primary subscriber identity associated with the customer premises equipment.

10. A customer premises equipment, comprising:
a processor; and
a memory that stores executable instructions that, when executed by the processor, facilitate performance of operations, comprising:
allocating a first amount of bandwidth to a primary user equipment connected to a customer premises equipment via a first network connection of a first network that is associated with the customer premises equipment, wherein the customer premises equipment is associated with a first subscriber account of a primary subscriber identity, and wherein the allocating the first amount of bandwidth:
  is based on a usage of bandwidth via the customer premises equipment by the primary user equipment over a sample period, and
  does not exceed a bandwidth level associated with the primary subscriber identity;
determining a bandwidth capacity for transmissions between the customer premises equipment and a network node device of a fixed packet network that is different from the first network;
in response to a request, from a secondary user equipment associated with a secondary subscriber identity, to connect to the customer premises equipment via a wireless connection of a second network that is associated with the customer premises equipment, determining whether a threshold bandwidth level is able to be allocated to the secondary user equipment, and
facilitating the secondary user equipment to connect to the customer premises equipment, wherein the second network is different from the first network and different from the fixed packet network, wherein the customer premises equipment is not associated with a second subscriber account of the secondary subscriber identity, and wherein the secondary subscriber identity has not purchased a level of bandwidth allocated by the customer premises equipment; and
allocating, by the customer premises equipment, a second amount of bandwidth to the secondary user equipment based on the first amount of bandwidth allocated to the primary user equipment and the bandwidth capacity.

11. The customer premises equipment of claim 10, wherein the operations further comprise, prior to allowing the secondary user equipment to connect to the customer premises equipment, receiving an authentication that the secondary user equipment is authorized to connect to the customer premises equipment.

12. The customer premises equipment of claim 11, wherein the authentication is based on whether the secondary subscriber identity is a subscriber identity to a communications service provider entity that operates the fixed packet network.

13. The customer premises equipment of claim 11, wherein the authentication is determined based on a subscriber home location registry comprising subscriber data that indicates that the secondary user equipment belongs to a subscriber identity of a communications service provider entity that operates the fixed packet network.

14. The customer premises equipment of claim 10, wherein the first amount of bandwidth is further based on a bandwidth overhead margin to account for an event in which the primary user equipment increases demand for bandwidth to be allocated by the customer premises equipment.

15. The customer premises equipment of claim 10, wherein the customer premises equipment comprises a wireless router, and wherein the first network comprises a wi-fi network.

16. The customer premises equipment of claim 10, wherein the bandwidth level associated with the primary subscriber identity is based on an agreement between a communications service provider entity and the primary subscriber identity.

17. A customer premises equipment, comprising:
  a processor; and
  a memory that stores executable instructions that, when executed by the processor, facilitate performance of operations, comprising:
    allocating a first amount of bandwidth to primary user devices connected to the customer premises equipment via a first network that is associated with the customer premises equipment, and wherein the first amount of bandwidth:
      is based on a usage of bandwidth enabled by the customer premises equipment on behalf of the primary user devices over a sample period, and
      does not exceed a bandwidth level associated with a first subscriber account of a primary subscriber identity associated with the customer premises equipment;
    in response to:
      a request, from a secondary user device associated with a secondary subscriber identity that is not associated with the first subscriber account, to connect to the customer premises equipment via a wireless connection of a second network that comprises a wireless local area network that is associated with the customer premises equipment, wherein the customer premises equipment is not associated with a second subscriber account of the secondary subscriber identity, and wherein the secondary subscriber identity has not purchased a level of bandwidth allocated by the customer premises equipment,
      an authentication that the secondary user device is authorized to connect to the customer premises equipment, and
      a determination that a threshold bandwidth level is able to be allocated to the secondary user device,
    facilitating the secondary user device to connect to the customer premises equipment via the wireless connection; and
    allocating a second amount of bandwidth to the secondary user device, wherein the second amount of bandwidth is allocated based on the first amount of bandwidth allocated to the primary user devices and based on a total bandwidth capacity for transmissions between the customer premises equipment and a network node device of a fixed packet network different from the first network and the second network.

18. The customer premises equipment of claim 17, wherein the first amount of bandwidth is further based on a bandwidth overhead margin to account for an event in which the primary user devices increase demand for bandwidth from the customer premises equipment.

19. The customer premises equipment of claim 17, wherein the first network comprises a wi-fi network.

20. The customer premises equipment of claim 17, wherein the customer premises equipment further comprises an ethernet port, and wherein the first network comprises an ethernet network.

* * * * *